US012265392B2

(12) United States Patent
Maeda

(10) Patent No.: US 12,265,392 B2
(45) Date of Patent: Apr. 1, 2025

(54) INFORMATION PROCESSING DEVICE, INFORMATION PROCESSING SYSTEM, AND BEHAVIOR PLANNING METHOD

(71) Applicant: SONY CORPORATION, Tokyo (JP)

(72) Inventor: Keisuke Maeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 683 days.

(21) Appl. No.: 17/250,298

(22) PCT Filed: May 27, 2019

(86) PCT No.: PCT/JP2019/020975
§ 371 (c)(1),
(2) Date: Dec. 29, 2020

(87) PCT Pub. No.: WO2020/008755
PCT Pub. Date: Jan. 9, 2020

(65) Prior Publication Data
US 2021/0141381 A1 May 13, 2021

(30) Foreign Application Priority Data

Jul. 6, 2018 (JP) .................. 2018-129480

(51) Int. Cl.
G05D 1/00 (2024.01)
G01C 21/00 (2006.01)
(52) U.S. Cl.
CPC ......... G05D 1/0214 (2013.01); G01C 21/383 (2020.08); G05D 1/0088 (2013.01); G05D 1/0231 (2013.01); G05D 1/0257 (2013.01)

(58) Field of Classification Search
CPC .. G05D 1/0214; G05D 1/0088; G05D 1/0231; G05D 1/0257; G05D 2201/0211; G05D 1/0217; G05D 1/0255; G05D 1/0274; G01C 21/383; G01C 21/206
USPC .......................................... 701/25
See application file for complete search history.

(56) References Cited

U.S. PATENT DOCUMENTS

| 6,266,576 | B1 * | 7/2001 | Okada | H01M 8/04373 |
| | | | | 414/730 |
| 9,646,597 | B1 * | 5/2017 | Beckman | B64D 47/00 |
| 9,962,055 | B2 * | 5/2018 | Zhang | G05D 1/0217 |
| 11,399,687 | B2 * | 8/2022 | Cheong | A47L 9/2805 |

(Continued)

FOREIGN PATENT DOCUMENTS

| JP | 2006-095635 A | 4/2006 |
| JP | 2008-213082 A | 9/2008 |

(Continued)

OTHER PUBLICATIONS

International Search Report and Written Opinion of PCT Application No. PCT/JP2019/020975, issued on Jul. 23, 2019, 10 pages of ISRWO.

Primary Examiner — Tuan C To
Assistant Examiner — Dominick Mulder
(74) Attorney, Agent, or Firm — CHIP LAW GROUP

(57) ABSTRACT

Influence of risks, such as sound and light generated by the host device, on surroundings is reduced. An information processing device (100) according to an embodiment includes a planning unit (105) configured to plan behavior executed by a drive unit (107) based on an influence target existing in a predetermined area and affected by a risk propagating in space.

19 Claims, 14 Drawing Sheets

(56) References Cited

U.S. PATENT DOCUMENTS

| | | | | |
|---|---|---|---|---|
| 2006/0058920 A1* | 3/2006 | Matsunaga | G05D 1/0255 | 700/245 |
| 2010/0063627 A1* | 3/2010 | Kitahama | G05D 1/0246 | 901/1 |
| 2011/0054689 A1* | 3/2011 | Nielsen | G05D 1/0088 | 700/258 |
| 2012/0290132 A1* | 11/2012 | Kokubo | B25J 9/1666 | 700/250 |
| 2013/0202121 A1* | 8/2013 | Georgiou | H03G 9/005 | 381/56 |
| 2014/0187258 A1* | 7/2014 | Khorashadi | G01C 21/206 | 455/456.1 |
| 2014/0230179 A1* | 8/2014 | Matsubara | A47L 11/4097 | 15/319 |
| 2014/0266701 A1* | 9/2014 | Mittal | H04M 1/72457 | 340/539.11 |
| 2015/0052703 A1* | 2/2015 | Lee | G05D 1/0255 | 701/28 |
| 2015/0250372 A1* | 9/2015 | T P | A47L 9/2826 | 701/28 |
| 2015/0287200 A1* | 10/2015 | Kokubun | G06T 7/20 | 348/143 |
| 2016/0278593 A1 | 9/2016 | Lee et al. | | |
| 2016/0370802 A1* | 12/2016 | Ueda | G05D 1/0214 | |
| 2017/0080558 A1* | 3/2017 | Cann | B60L 3/0061 | |
| 2017/0169683 A1* | 6/2017 | Ryder | G08B 17/12 | |
| 2018/0075309 A1* | 3/2018 | Sathyanarayana | G05D 1/0088 | |
| 2018/0120794 A1* | 5/2018 | Cheng | G05D 1/0022 | |
| 2018/0239359 A1* | 8/2018 | Jian | B60W 60/0053 | |
| 2018/0276485 A1* | 9/2018 | Heck | G06N 7/01 | |
| 2019/0331522 A1* | 10/2019 | Celikel | G01M 15/12 | |
| 2019/0369642 A1* | 12/2019 | Watabe | G06F 16/29 | |
| 2021/0162537 A1* | 6/2021 | Meyler | B25J 21/00 | |

FOREIGN PATENT DOCUMENTS

| | | |
|---|---|---|
| JP | 2013-169221 A | 9/2013 |
| JP | 2013-230294 A | 11/2013 |
| JP | 2017-169613 A | 9/2017 |
| JP | 2018-185727 A | 11/2018 |
| WO | 2015/072623 A1 | 5/2015 |

* cited by examiner

INFORMATION PROCESSING DEVICE, INFORMATION PROCESSING SYSTEM, AND BEHAVIOR PLANNING METHOD

CROSS REFERENCE TO RELATED APPLICATIONS

This application is a U.S. National Phase of International Patent Application No. PCT/JP2019/020975 filed on May 27, 2019, which claims priority benefit of Japanese Patent Application No. JP 2018-129480 filed in the Japan Patent Office on Jul. 6, 2018. Each of the above-referenced applications is hereby incorporated herein by reference in its entirety.

FIELD

The present disclosure relates to an information processing device, an information processing system, a behavior planning method, and a computer program.

BACKGROUND

Recently, autonomous mobile robots equipped with artificial intelligence, such as a robot cleaner and a pet robot at home and a transport robot at a factory or a distribution warehouse, have been actively developed.

Typically, in a behavior plan of an autonomous movement robot, for example, a movement path of the autonomous movement robot is scheduled by using a lattice map (also referred to as an occupancy map or an occupancy grid map, or simply referred to as a grid map) as two-dimensional matrix data.

In path search in determination of the movement path of an autonomous movement robot, the distance from the autonomous movement robot to an obstacle is used as a cost to avoid collision of the autonomous movement robot with the obstacle. Specifically, the existence probability of an obstacle is set to be high for a cell on a lattice map, which corresponds to a position where the existence of the obstacle is observed by a sensor or the like, and the existence probability of an obstacle is set to be low for a cell in which it is observed that no obstacle exists. Then, processing of expanding an obstacle region, and the like is executed on the lattice map to express the body size, safety factor, and the like of the autonomous movement robot, and thereafter, an optimum path is determined by using a graph search algorithm such as Dijkstra's algorithm or A* (start).

CITATION LIST

Patent Literature

Patent Literature 1: Japanese Laid-open Patent Publication No. 2006-95635
Patent Literature 2: Japanese Laid-open Patent Publication No. 2008-213082

SUMMARY

Technical Problem

However, a normal autonomous movement robot generates drive sound of a motor, voice, light, and the like to perform movement to a destination, various kinds of work using an arm and the like, communication with a user, and the like. Thus, in the path search, an optimum path needs to be searched not only to avoid influence of a physical risk such as collision with an obstacle on the host device but also to reduce influence of a risk such as sound or light generated by the host device on surroundings.

Thus, the present disclosure proposes an information processing device, an information processing system, a behavior planning method, and a computer program that are capable of reducing influence of risks, such as sound and light generated by the host device, on surroundings.

Solution to Problem

To solve the above-described problem, an information processing device according to one aspect of the present disclosure comprises a planning unit configured to plan behavior executed by a drive unit based on an influence target existing in a predetermined area and affected by a risk propagating in space.

(Effects) With an information processing device according to an aspect of the present disclosure, it is possible to produce in advance a behavior plan of a drive unit so that influence of a risk generated by the drive unit on an influence target in surroundings is reduced. Accordingly, it is possible to reduce influence of risks, such as sound and light generated by the host device, on surroundings.

Advantageous Effects of Invention

According to the present disclosure, it is possible to achieve an information processing device, an information processing system, a behavior planning method, and a computer program that are capable of reducing influence of risks, such as sound and light generated by the host device, on surroundings. Note that the effect described herein is not necessarily limited but may be any effect described in the present disclosure.

DESCRIPTION OF EMBODIMENTS

Figure 1:
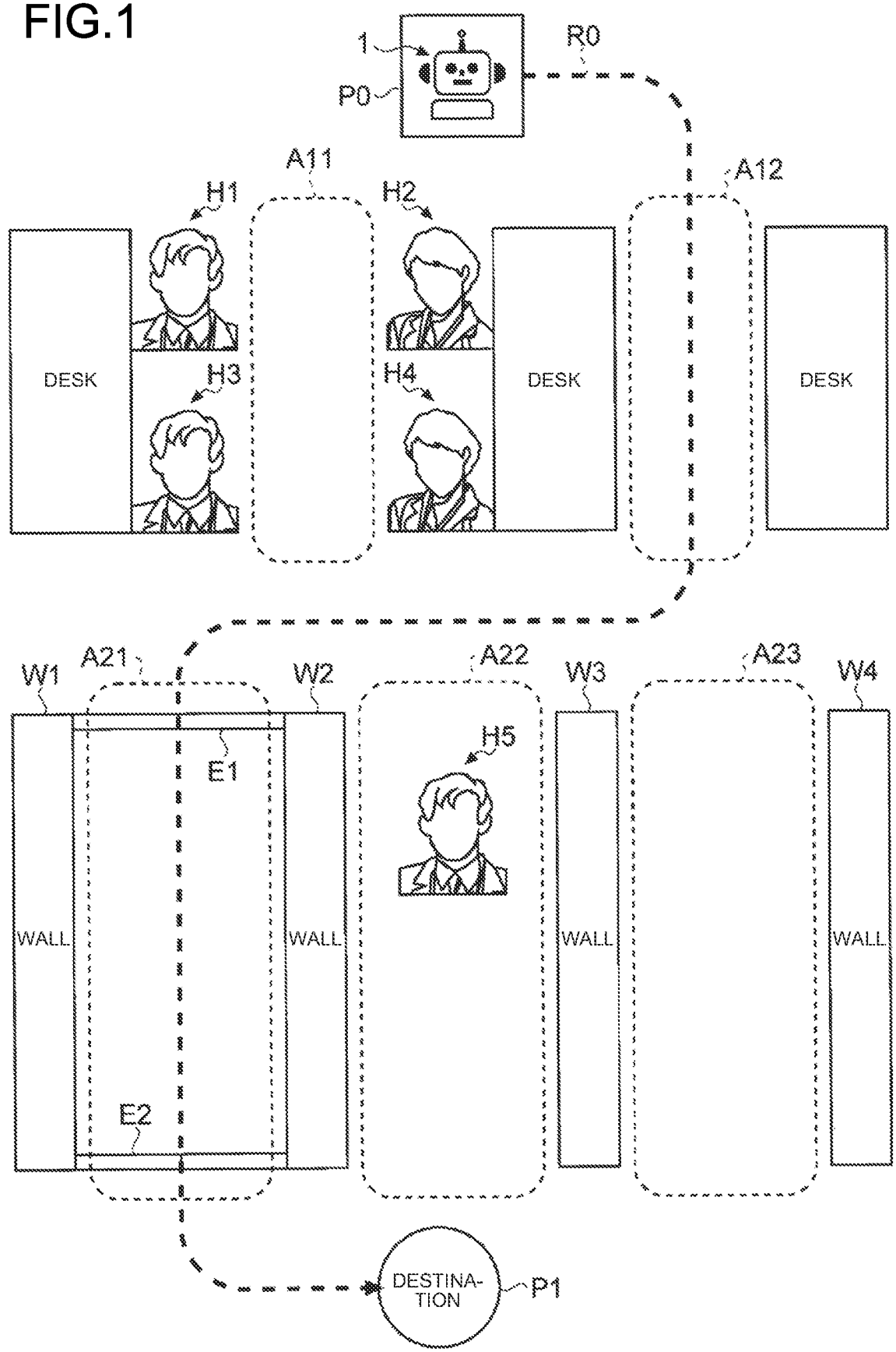
FIG. 1 is a diagram for description of an exemplary outline of an embodiment of the present disclosure.

An information processing device, an information processing system, a behavior planning method, and a computer program according to an embodiment of the present disclosure will be described below in detail with reference to the accompanying drawings. Note that, in the embodiment described below, identical sites are denoted by an identical reference sign to omit duplicate description thereof.

The present disclosure will be described in accordance with the following order of contents.

1. Embodiment
1.1 Outline of autonomous system
1.2 Exemplary configuration of autonomous system
1.3 Exemplary operation of autonomous system
1.3.1 Exemplary operation of influence target recognition unit
1.3.2 Exemplary operation of influence target storage unit
1.3.3 Exemplary operation of environmental light/sound recognition unit
1.3.4 Exemplary operation of environmental light/sound storage unit
1.3.4.1 Sound source registration/update processing
1.3.4.2 Noise level registration processing at observation position
1.3.4.3 Noise level estimation operation
1.3.4.3.1 Flowchart of noise level estimation operation
1.3.5 Exemplary operation of transfer function estimation unit
1.3.5.1 Exemplary transfer function estimation operation
1.3.5.2 Exemplary noise level interpolation operation
1.3.5.2.1 Flowchart of noise level interpolation operation
1.3.6 Exemplary operation of transfer function storage unit
1.3.7 Exemplary operation of behavior planning map production unit
1.3.7.1 Flowchart of allowable sound amount map production operation
1.3.8 Exemplary operation of behavior planning map production unit
1.4 Exemplary system configuration
1.5 Autonomous mobile object
1.6 Conclusion

1. Embodiment

In an embodiment exemplarily described below, an application target is assumed to be an autonomous system including an autonomous mobile object (hereinafter also referred to as the host device), such as a domestic pet robot, a robot cleaner, an unmanned aircraft, a follow-up transport robot, or an automobile having an automated driving function, on which various sensors are mounted, but the present disclosure is not limited to such an autonomous system and the application target may be a various device or system that is likely to emit sound through drive (including sound emission and light emission) by an autonomous or remote operation, for example, a movable unit of a robotic arm, a manipulator, or the like including a drive mechanism, and/or a smart speaker having an interactive communication function.

In the embodiment exemplarily described below, influence of a risk propagating in space, such as sound, light, wind, or smell generated by an autonomous mobile object 1 on surroundings is considered when the autonomous mobile object produces a behavior plan. Accordingly, the behavior plan can be produced to reduce adverse influence of the autonomous mobile object 1 on environment, and thus it is possible to achieve an autonomous system that can be accepted in environment in which a person or another autonomous mobile object exists. For example, when influence of sound generated by the autonomous mobile object 1 on surrounding environment is considered, it is possible to produce a behavior plan of preferentially taking a path with less people or quietly traveling in front of a meeting room, the behavior plan being suitable for environment, such as an office or a library, including a large number of targets that are largely affected by a risk propagating in space.

1.1 Outline of Autonomous System

FIG. 1 is a diagram for description of an exemplary outline of the present embodiment. FIG. 1 exemplarily illustrates a case in which the autonomous mobile object 1 produces a behavior plan of moving from a start place P0 to a destination P1 and moves from the start place P0 to the destination P1 in accordance with the behavior plan.

As illustrated in FIG. 1, in the present embodiment, first, for example, targets (such as Persons H1 to H5 and electronic devices; hereinafter referred to as influence targets) largely affected by a risk generated by the autonomous mobile object 1 and the positions of boundaries (such as walls W1 to W4, doors, and curtains) to which risk transfer is low are determined based on observation of surroundings by a sensor and information collected in advance. Then, the degree of influence of the risk generated by the autonomous mobile object 1 is calculated by using the transfer function of the risk, and Path R0 on which the degree of influence of the risk generated by the autonomous mobile object 1 on surrounding influence targets is small is planned based on a result of the calculation. Specifically, Path R0 on which the degree of influence of the risk generated by the autonomous mobile object 1 on surrounding influence targets is small is planned by prioritizing Paths A12, A21, and A23 on which no influence targets exist or the number of influence targets is small over Paths A11 and A22 on which influence targets (Persons H1 to H4) exist, prioritizing Paths A12, A21, and A23 far away from Paths A11 and A22 on which influence targets exist, or prioritizing Path A21 on which Automatic doors E1 and E2 that shield the risk exist over Paths A22 and A23 on which no partition that shields risk propagation exists.

When a behavior plan as illustrated in FIG. 1 is to be produced, for example, focusing on points below is thought to be one guide for producing a better behavior plan. However, the present disclosure is not limited to these points but may be modified in various manners in accordance with, for example, a purpose and surrounding environment.

Figure 2:
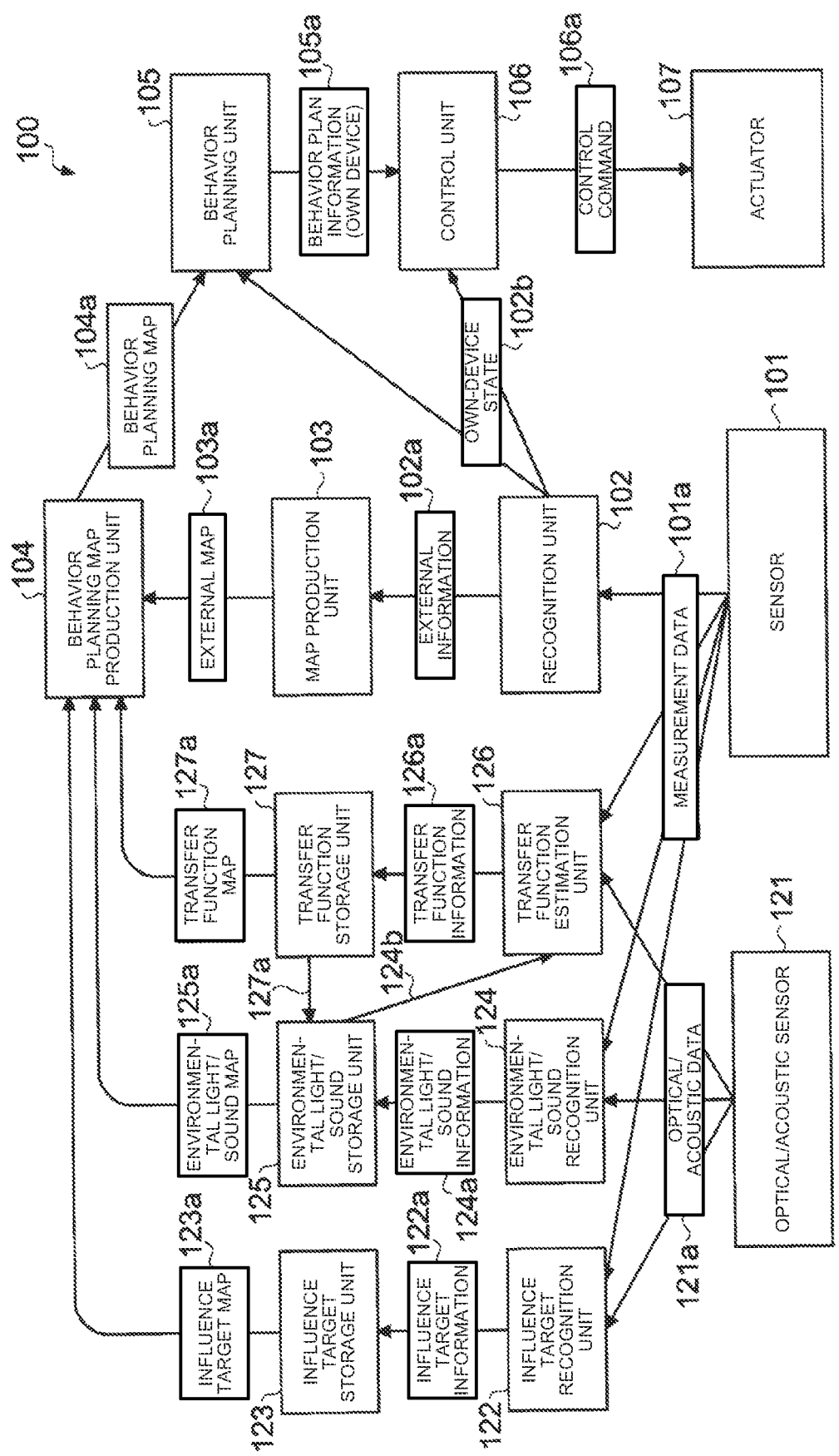
FIG. 2 is a block diagram illustrating an exemplary schematic configuration of an autonomous system according to the embodiment of the present disclosure.

(1) Detection of an influence target affected by a risk such as sound, light, wind, or smell
(2) Estimation of a transfer function of a risk such as sound, light, wind, or smell in surrounding space
(3) Estimation of influence of a risk such as sound, light, wind, or smell generated by the host device on an influence target
(4) Production of a behavior plan with estimated influence taken into consideration 1.2 Exemplary Configuration of Autonomous System Subsequently, an exemplary schematic configuration of an autonomous system according to the present embodiment will be described below in detail with reference to the accompanying drawings. FIG. 2 is a block diagram illustrating the exemplary schematic configuration of the autonomous system according to the present embodiment. As illustrated in FIG. 2, this autonomous system 100 includes a sensor 101, a recognition unit 102, a map production unit 103, a behavior planning map production unit (fourth production unit) 104, a behavior planning unit 105, a control unit 106, an actuator 107, an optical/acoustic sensor 121, an influence target recognition unit (first recognition unit) 122, an influence target storage unit (first production unit) 123, an environmental light/sound recognition unit (second recognition unit) 124, an environmental light/sound storage unit (second production unit) 125, a transfer function estimation unit (estimation unit) 126, and a transfer function storage unit (third production unit) 127.

The sensor 101 includes a sensor module such as an external sensor configured to measure an external quantity or an internal sensor (also referred to as a body sensor) configured to measure the state of the host device. The external sensor may be, for example, a camera (including RGB, gray scale, stereo, depth, infrared cameras) configured to acquire external information as image information, a time-of-flight (ToF) sensor, a light-detection-and-ranging or laser-imaging-detection-and-ranging (LIDAR) sensor, or a radio-detection-and-ranging (RADAR) sensor. The internal sensor may be, for example, an encoder, a potentiometer, a voltmeter, an ammeter, a deformation gauge, a pressure meter, an inertial measurement unit (IMU), a thermometer, or a hygrometer. Note that the number of sensor modules included in the sensor 101 is not limited to one but may be two or more. The sensor 101 outputs measurement data 101a measured by the sensor module as described above to, for example, the recognition unit 102, the influence target recognition unit 122, the environmental light/sound recognition unit 124, and the transfer function estimation unit 126 to be described later.

The recognition unit 102 is a module configured to receive the measurement data 101a of the sensor 101 and recognize an external quantity or the state of the host device. The external recognition may be achieved by, for example, obstacle recognition, shape recognition (such as floor recognition or wall recognition), general object recognition, marker recognition, character recognition, white line and lane recognition, or voice recognition. The body recognition may be achieved by, for example, self-position estimation, self-motion state estimation (speed, acceleration, jerk, or the like), or body state estimation (power remaining amount, temperature, joint angle, or the like). The recognition unit 102 outputs external information 102a obtained as a result of the external recognition to, for example, the map production unit 103 to be described later. The recognition unit 102 outputs an own-device state 102b obtained as a result of the body recognition to, for example, the behavior planning unit 105 and the control unit 106 to be described later. Note that the number of pieces of external information 102a and the number of own-device states 102b are one in illustration of FIG. 2, but does not necessarily need to be one and may be two or more in accordance with, for example, the kind of the sensor 101 and the kind of a map produced by the map production unit 103.

The map production unit 103 is a module configured to receive the external information 102a output from the recognition unit 102 as a result of the external recognition and produce an external map. The map production unit 103 produces an external map 103a used to produce a behavior plan, by accumulating the external information 102a from the recognition unit 102 in a temporally sequential manner or integrating the external information 102a from a plurality of recognition units 102. The produced external map 103a may be, for example, an obstacle movement region map indicating whether the autonomous mobile object 1 can pass, an object map indicating which object is positioned where, or a topological map indicating the names, relation, and meanings of regions. Note that the number of produced external maps 103a is one in illustration of FIG. 2 but is not limited to one, and a plurality of external maps 103a may be produced in accordance with the kind, usage, and the like of a map.

The behavior planning map production unit 104 is a module configured to receive the external map 103a produced by the map production unit 103 and produce a behavior planning map 104a in which information for a behavior plan is embedded. In this case, the behavior planning map production unit 104 embeds various kinds of information in the behavior planning map 104a in accordance with meanings of objects and regions included in the external map 103a for the autonomous mobile object 1. Specifically, the behavior planning map production unit 104 embeds various kinds of information in the behavior planning map 104a by using, as additional inputs, information (an influence target map 123a to be described later) related to an influence target, information (an environmental light/sound map 125a to be described later) related to a risk existing in environment, such as environmental light, environmental sound, environmental wind, or environmental smell, and information (for example, a transfer function map 127a to be described later) related to a risk transfer function. For example, in the present embodiment, the behavior planning map production unit 104 determines the degree (such as light amount, sound amount, air volume, or smell strength) of a risk as a reference among risks existing in environment, and determines an allowable risk degree (such as light amount, sound amount, air volume, or smell strength) with taken into consideration sensitivity in accordance with an influence target. Then, the behavior planning map production unit 104 produces a map (corresponding to, for example, an allowable sound amount map 104c to be described later) related to the allowable degree of a risk in space by using the determined allowable risk degree and the transfer function, and sets the produced map related to the allowable risk degree as the behavior planning map 104a. Note that the production of the behavior planning map 104a will be described later in detail. The number of behavior planning maps 104a is one in illustration of FIG. 2 but is not limited to one, and a plurality of behavior planning maps 104a may be produced in accordance with usage and the like.

The behavior planning unit 105 is a planning unit configured to plan behavior executed by the actuator 107 based on the position of an influence target affected by a risk in a predetermined area and is a module configured to receive the behavior planning map 104a produced by the behavior planning map production unit 104 and the own-device state 102b obtained as a result of the body recognition at the recognition unit 102 and produce and output behavior plan information (host device) 105a. The behavior plan information (host device) 105a may be information having a hierarchical structure or may be a set of a plurality of pieces of information. For example, the behavior plan information (host device) 105a has a hierarchical structure of behavior policy, long-period behavior, short-period behavior, and the like. When the content of behavior is movement, the behavior plan information (host device) 105a may include a topological path plan using a wide-area topological map, a coordinate path plan using an obstacle map of an observation range, or a motion plan including dynamics of the next several seconds.

The control unit 106 is a module configured to receive the behavior plan information (host device) 105a and the own-device state 102b and output a control command 106a. For example, the control unit 106 calculates error between behavior planned by the behavior plan information (host device) 105a and the own-device state 102b, determines the control command 106a with which the error is reduced, and outputs the determined control command 106a to the actuator 107. The actuator 107 is a drive unit configured to execute behavior that causes generation of a risk propagating in space. Note that the number of control commands 106a is one in illustration of FIG. 2 but is not limited to one, and a plurality of control commands 106a may be output in accordance with the number of actuators 107, the contents of behavior, and the like. The control command 106a may have a hierarchical structure.

The actuator 107 is a module configured to receive the control command 106a and act on the real world. The actuator 107 may include an engine, a motor, a speaker, a projector, and a light emitter (such as a light bulb, an LED, or a laser pointer). Note that the number of actuators 107 is one in illustration of FIG. 2 but may be two or more as described above.

The optical/acoustic sensor 121 is a sensor module, such as an illuminance sensor, a camera, a microphone, a microphone array, a vibration sensor, or a high-speed camera, for measuring a risk in external environment and outputting optical/acoustic data 121a. The number of optical/acoustic sensors 121 is not limited to one but may be two or more. The optical/acoustic sensor 121 outputs the optical/acoustic data 121a generated from a sensing result to the influence target recognition unit 122, the environmental light/sound recognition unit 124, and the transfer function estimation unit 126.

The influence target recognition unit 122 is a module for receiving the measurement data 101a and the optical/acoustic data 121a and recognizing an influence target affected by a risk generated by the autonomous mobile object 1. This recognition processing executed by the influence target recognition unit 122 may include, for example, person recognition (such as person detection, person identification, or person position estimation), behavior estimation (for example, having a chat or concentrated in work), state estimation (for example, wearing glasses or sunglasses or wearing an earphone or a headphone), region-context (meeting room or talking on phone) detection, baby recognition, or target position-direction estimation based on sound (speaking voice, working sound, or sleeping sound). Then, the influence target recognition unit 122 determines, as a result of the recognition processing as described above, identification information (ID) for identifying the recognized influence target, an estimated position of the influence target, the type of the influence target, and the degree (such as sensitivity) of influence of the risk, which is estimated for the influence target, and outputs the determined result as influence target information 122a. In this manner, the influence target recognition unit 122 according to the present embodiment not only specifies the kind, position, and the like of an object (detection target) through object detection, position estimation, and the like, but also estimates the degree of influence of a risk on the object (detection target). Note that the number of influence target recognition units 122 is not limited to one but may be two or more.

The influence target storage unit 123 is a module for storing and managing the influence target information 122a. Specifically, the influence target storage unit 123 stores the influence target information 122a received from the influence target recognition unit 122 on a transitory storage medium for a short period or a long period, and reads the influence target information 122a already stored on a non-transitory storage medium. Then, the influence target storage unit 123 accumulates the influence target information 122a in a temporally sequential manner and produces the influence target map 123a including information related to a region in which an influence target is likely to exist, such as "a working person is highly likely to exist in this region" or "this is a meeting room and quiet is required in daytime". In this manner, the influence target storage unit 123 according to the present embodiment executes not only storage of the influence target information 122a and production of the influence target map 123a but also accumulation of information such as the degree (the sensitivity of estimation of an influence target to be described later) of influence of a risk on an influence target, difference in attributes of influence target between time slots, and the existence probability of an influence target. Note that the number of influence target storage units 123 is not limited to one but may be two or more. The produced influence target map 123a is output to the behavior planning map production unit 104 described above.

The environmental light/sound recognition unit 124 is a module for receiving the optical/acoustic data 121a (the measurement data 101a, as necessary) and recognizing a risk level of the entire environment, a risk level of each risk generation source, information such as the amount of light and the amount of sound for each frequency, the power of wind for wind direction, and the strength of smell for each kind of smell, the direction of the risk generation source, and the position of the risk generation source. The risk level is information related to the risk degree and is, for example, information such as the brightness level, the noise level, the wind power, or the smell strength. The risk generation source may be a light source, a sound source, or a wind or smell generation source.

The environmental light/sound recognition unit 124 estimates a model of a risk generation source (an optical model of each light source, an acoustic model of each sound source, a wind model of each wind generation source, or a smell model of each smell generation source; hereinafter referred to as a risk model) by executing, for example, orientation related to the risk generation source (for example, light-source or sound-source orientation) or separation of the risk generation source (for example, light-source or sound-source separation). Note that the risk model is a model related to the kind and degree of a risk generated by the risk generation source, and the optical model or the acoustic model includes a frequency spectrum, a characteristic waveform, and the like. In addition, the wind model includes the wind direction, the wind power, and the like, and the smell model includes the smell kind, the smell strength, and the like.

Then, the environmental light/sound recognition unit 124 outputs environmental light/sound information 124a including one or more pieces of risk source data (corresponding to, for example, sound source data to be described later) including the risk level at a place, identification information (such as a light source or sound source ID) for identifying each risk generation source, the estimated position of the risk generation source, and the risk model of the risk generation source. Note that the number of environmental light/sound recognition units 124 is not limited to one but may be two or more. Processing executed by the environmental light/sound recognition unit 124 will be described later in detail.

The environmental light/sound storage unit 125 is a module for storing and managing the environmental light/sound information 124a. Specifically, the environmental light/sound storage unit 125 stores the environmental light/sound information 124a received from the environmental light/sound recognition unit 124 on a transitory storage medium for a short period or a long period and reads the environmental light/sound information 124a already stored on a non-transitory storage medium. Then, the environmental light/sound storage unit 125 determines the risk level at each place (corresponding to each grid on a grid map G32 to be described later) in a predetermined area by accumulating the environmental light/sound information 124a in a temporally sequential manner, and produces risk data (corresponding to, for example, environmental sound data to be described later).

In addition, the environmental light/sound storage unit 125 receives the transfer function map 127a from the transfer function storage unit 127 to be described later and estimates, by using the received transfer function map 127a and the risk data, the risk level at a place where a risk (for example, environmental light, environmental sound, environmental wind, or environmental smell) is yet to be directly observed by the optical/acoustic sensor 121. Then, the environmental light/sound storage unit 125 produces, by using an observed risk level and the estimated risk level, the environmental light/sound map (also referred to as an environment map) 125a including information related to the risk level attributable to a risk generation source other than the host device. The environmental light/sound map 125a produced in this manner is output to the behavior planning map production unit 104. Note that the above-described risk data is also output to the transfer function estimation unit 126. The number of environmental light/sound storage units 125 is not limited to one but may be two or more. Processing executed by the environmental light/sound storage unit 125 will be described later in detail.

The transfer function estimation unit 126 is a module for receiving the measurement data 101a and the optical/acoustic data 121a and estimating the transfer function of a risk such as light, sound, or wind in space. For example, the transfer function estimation unit 126 estimates, for example, the materials and thicknesses of walls, furniture, and the like by using the sensor 101 such as a camera or a LIDAR sensor, specifies an attenuation rate based on, for example, the estimated materials and thicknesses of walls, furniture, and the like, and estimates the transfer function from the specified attenuation rate. In addition, for example, the transfer function estimation unit 126 receives the environmental light/sound map 125a from the environmental light/sound storage unit 125, determines the risk levels at a plurality of places, and directly estimates the transfer function between places from the determined risk levels at the places. Then, the transfer function estimation unit 126 outputs transfer function information 126a between two places at each frequency based on the estimated transfer function between places. Note that the number of transfer function estimation units 126 is not limited to one but may be two or more. Processing executed by the transfer function estimation unit 126 will be described later in detail.

The transfer function storage unit 127 is a module for storing and managing the transfer function information 126a. Specifically, the transfer function storage unit 127 stores the transfer function information 126a received from the transfer function estimation unit 126 on a transitory storage medium for a short period or a long period, and reads the transfer function information 126a already stored on a non-transitory storage medium. Then, the transfer function storage unit 127 accumulates the transfer function information 126a in a temporally sequential manner, thereby improving the accuracy of the transfer function in space and also producing the transfer function map 127a including information related to the transfer function indicating transferability of a risk in space. The produced transfer function map 127a is output to the behavior planning map production unit 104 described above. Note that the number of transfer function storage units 127 is not limited to one but may be two or more. Processing executed by the transfer function storage unit 127 will be described later in detail.

1.3 Exemplary Operation of Autonomous System

Subsequently, operation of the autonomous system 100 according to the present embodiment will be described below in detail with reference to the accompanying drawings. Note that the following description will be focused on operation of the influence target recognition unit 122, the influence target storage unit 123, the environmental light/sound recognition unit 124, the environmental light/sound storage unit 125, the transfer function estimation unit 126, the transfer function storage unit 127, the behavior planning map production unit 104, and the behavior planning unit 105. The operation exemplarily described below may be activated as, for example, a multi-task thread or process and sequentially executed as necessary. Although, for simplification, the following exemplarily describes a case in which a risk that affects an influence target is sound, the present disclosure is not limited thereto but is similarly applicable to light, wind, smell, and any other risk.

1.3.1 Exemplary Operation of Influence Target Recognition Unit

First, exemplary operation of the influence target recognition unit 122 will be described below in detail with reference to the accompanying drawings. In the present description, an influence target is a target (object) existing in environment and largely affected by a risk of sound generated by the autonomous mobile object 1. This recognition target may include not only a living individual such as a person but also a non-living object such as a microphone, and a space such as a meeting room having a region.

Figure 3:
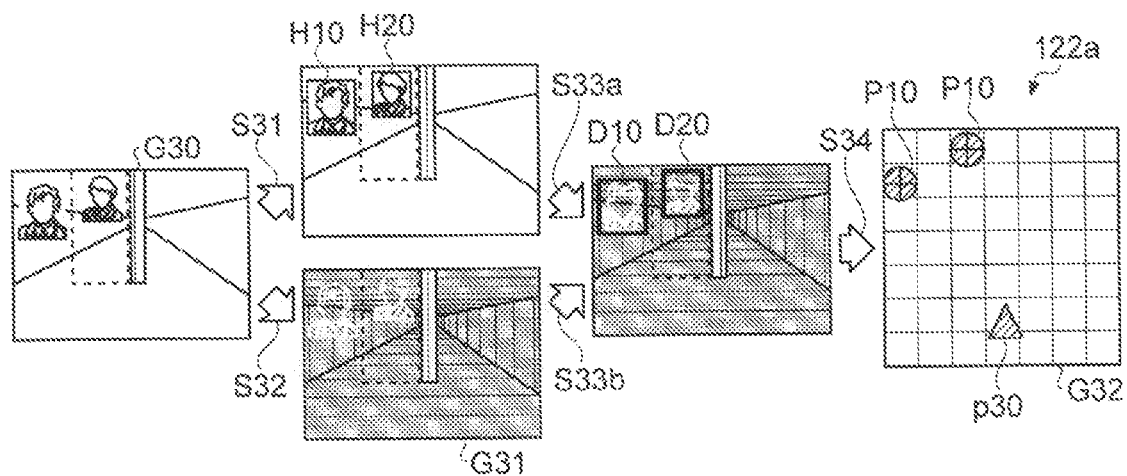
FIG. 3 is a diagram illustrating an exemplary process of class setting according to the embodiment of the present disclosure.

As described above, the influence target recognition unit 122 not only specifies the kind, position, and the like of an object (detection target) through object detection, position estimation, and the like, but also estimates the degree of influence of sound on the object. Thus, the influence target recognition unit 122 executes, as the influence target recognition processing, class setting focused on an object affected by sound. FIG. 3 illustrates the process of the class setting. Note that FIG. 3 exemplarily illustrates class setting in which "person working in concentration" and "person wearing a headphone" are used as classes of an object affected by sound.

As illustrated in FIG. 3, in the class setting, object detection (S31) is executed on RGB image G30 acquired by the sensor 101 to detect persons (rectangular regions H10 and H20) as influence targets included in the RGB image G30. In parallel to the object detection (S31), image processing (S32) using a technology such as stereo viewing is executed to generate Depth image G31 of RGB image G30. Subsequently, Distances D10 and D20 from the autonomous mobile object 1 to the persons (rectangular regions H10 and H20) and the directions thereof are measured based on the positions of rectangular regions H10 and H20 in Depth image G31 (S33a and S33b), and positions p10 and p20 of the persons (rectangular regions H10 and H20) on the two-dimensional matrix data (hereinafter referred to as the grid map) G32 are estimated based on the measured distances D10 and D20 and directions (S34). Then, the estimated positions p10 and p20 of the persons (rectangular regions H10 and H20) on the grid map G32 are output as the influence target information 122a.

Note that the grid map G32 in FIG. 3 is, for example, map information corresponding to the behavior range of the autonomous mobile object 1 in real space and is map information related to a region common to other information such as the influence target information 122a, the influence target map 123a, the environmental light/sound information 124a, the environmental light/sound map 125a, the transfer function map 127a, the external map 103a, and the behavior planning map 104a. A position p30 of the autonomous mobile object 1 indicated by a triangular mark in FIG. 3 is may be not included in the influence target information 122a. The two-dimensional grid map G32 is illustrated in FIG. 3 but the present disclosure is not limited thereto, and a three-dimensional grid map using a box cell may be used. In this case, the estimated positions p10 and p20 of the persons (rectangular regions H10 and H20) are three-dimensional positions including information in the height direction.

1.3.2 Exemplary Operation of Influence Target Storage Unit

Figure 4:
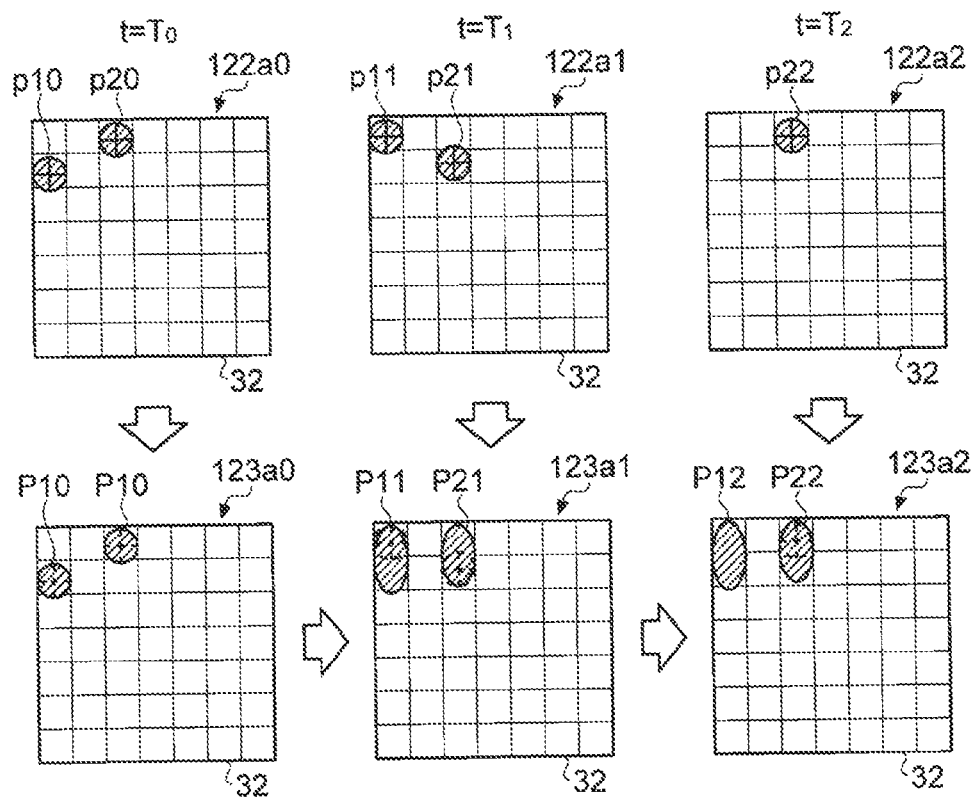
FIG. 4 is a diagram illustrating an exemplary process of processing executed by an influence target storage unit according to the embodiment of the present disclosure.

Subsequently, exemplary operation of the influence target storage unit 123 will be described below in detail with reference to the accompanying drawings. The influence target storage unit 123 accumulates, in a temporally sequential manner based on, for example, information of a time point at which an RGB image is acquired, the influence target information 122a obtained at each timing by the influence target recognition unit 122, thereby analyzing and storing spatial and temporal characteristics of an influence target. FIG. 4 illustrates the process of this processing executed by the influence target storage unit 123. Note that, in FIG. 4, the upper part illustrates exemplary influence target information 122a (for example, the position of an influence target) acquired at each timing $t(=T_0$ to $T_2)$, and the lower part illustrates exemplary influence target map 123a updated by using the influence target information 122a obtained at each timing $t(=T_0$ to $T_2)$. No influence target is detected before timing $T_0$.

As illustrated in FIG. 4, the influence target storage unit 123 produces influence target map 123a0 at timing $T_0$ by updating the current influence target map 123a based on influence target information 122a0 (corresponding to the influence target information 122a in FIG. 3) at timing $T_0$, which is input from the influence target recognition unit 122. Since no influence target is detected before timing $T_0$, existence probability distributions P10 and P20 based on the positions p10 and p20 of the persons (rectangular regions H10 and H20) included in the influence target information 122a0 are registered in the influence target map 123a0 after the update.

Subsequently, the influence target storage unit 123 produces an influence target map 123a1 at timing $T_1$ by updating the current influence target map 123a0 based on influence target information 122a1 at timing $T_1$, which is input from the influence target recognition unit 122. Specifically, the influence target storage unit 123 generates existence probability distributions P11 and P21 of the persons (rectangular regions H10 and H20) based on the existence probability distributions P10 and P20 registered in the influence target map 123a0 at timing $T_0$ and positions p11 and p21 of the persons (rectangular regions H10 and H20) included in the influence target information 122a1, and updates the influence target map 123a0 with the generated existence probability distributions P11 and P21 to produce the influence target map 123a1 at timing $T_1$.

Thereafter, the influence target storage unit 123 similarly updates the current influence target map 123a based on the influence target information 122a input from the influence target recognition unit 122, thereby producing the latest influence target map 123a at timing t.

In this manner, the influence target storage unit 123 accumulates results (the influence target information 122a) of the influence target recognition processing, which are obtained from a sensing result at each timing, in a temporally sequential manner, thereby storing spread (existence probability distribution) of the existing position of each influence target. Note that in the case exemplarily illustrated in FIG. 4, the influence target storage unit 123 stores short-period information (the influence target information 122a) obtained from a sensing result, but is not limited to and may store long-period information such as "a person is highly likely to exist in an upper-left region in daytime". Note that the short-period information may be information having effectiveness (also referred to as freshness) that decreases in a short duration, and the long-period information may be information having effectiveness that is maintained for a long duration.

1.3.3 Exemplary Operation of Environmental Light/Sound Recognition Unit

Subsequently, exemplary operation of the environmental light/sound recognition unit 124 will be described below in detail with reference to the accompanying drawings. The environmental light/sound recognition unit 124 recognizes characteristics of sound at each place (corresponding to a grid) in environment (corresponding to the grid map G32) and also recognizes or estimates the position and the like of a sound source as the generation source of the sound. The sound source recognition is performed to estimate characteristics of sound in the entire space. The characteristics of sound are, for example, a frequency spectrum and temporal change thereof. Thus, the optical/acoustic data 121a output as a result of detection from the optical/acoustic sensor 121 may include the frequency spectrum, temporal change thereof, position, and direction. In the following description, such information related to a sound source is referred to as sound source data.

Figure 5:
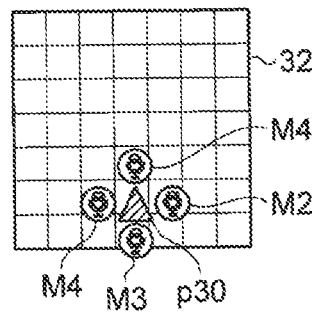
FIG. 5 is a diagram illustrating the position of an autonomous mobile object, the number and positions of sensors, and the like, when optical/acoustic data is acquired according to the embodiment of the present disclosure.
Figure 6:
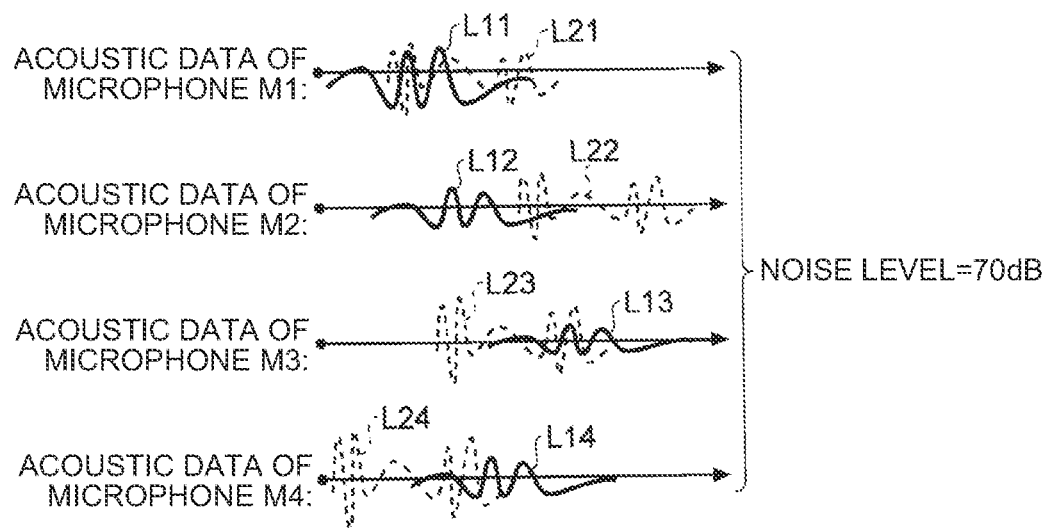
FIG. 6 is a diagram illustrating exemplary optical/acoustic data acquired by each sensor of the autonomous mobile object according to the embodiment of the present disclosure.
Figure 7:
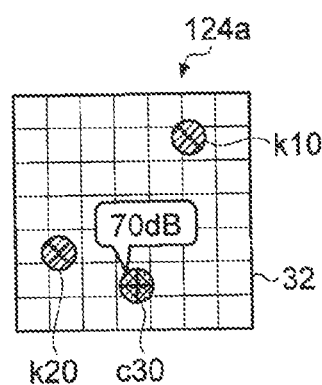
FIG. 7 is a diagram illustrating exemplary environmental light/sound information generated from optical/acoustic data according to the embodiment of the present disclosure.

FIGS. 5 to 7 are diagrams illustrating the process of acoustic recognition processing: FIG. 5 illustrates the position of the autonomous mobile object 1 and the number, positions, and the like of sensors 101 (in the present description, microphones or microphone arrays) when the optical/acoustic data 121a (in the present example, acoustic data) is acquired, FIG. 6 illustrates exemplary optical/acoustic data 121a acquired by each sensor 101 (a microphone or a microphone array) of the autonomous mobile object 1, and FIG. 7 illustrates exemplary environmental light/sound information 124a (in the present example, environmental sound information) generated from the optical/acoustic data 121a. Note that the process illustrated in FIGS. 5 to 7 is similarly applicable to a case in which light is a target in place of sound.

As illustrated in FIG. 5, in the present example, the autonomous mobile object 1 includes four microphones M1 to M4 disposed at front, back, right, and left parts. The optical/acoustic data 121a having waveforms as illustrated in FIG. 6 is obtained from the microphones M1 to M4 of the autonomous mobile object 1. In addition, the position p30 of the autonomous mobile object 1 is specified by self-position estimation of a dead reckoning scheme or a star reckoning scheme based on, for example, information input from the sensor 101. The environmental light/sound recognition unit 124 extracts characteristic waveforms (waveforms L11 to L14 of solid lines and waveforms L21 to L24 of dashed lines) from among the waveforms illustrated in FIG. 6 and estimates positions k10 and k20 of sound sources of the respective sounds as illustrated in FIG. 7 based on the difference among times at which sounds of the waveforms L11 to L14 and L21 to L24 reach the respective microphones M1 to M4. Accordingly, the sound source data in the present description includes, for example, information of the estimated positions k10 and k20.

In the example illustrated in FIG. 7, the waveform L24 reaches the microphone M4 at an earliest timing and the waveform L21 corresponding to the waveform L24 reaches the microphone M1 before the waveform L23 corresponding to the waveform L24 reaches the microphone M3, and thus the sound source of sound of the waveforms L21 to L24 is estimated to exist at the position k20 slightly on the front side of the left side of the autonomous mobile object 1. Similarly, the sound source of sound of the waveforms L11 to L14 is estimated to exist at the position k10 on the front side of the right side of the autonomous mobile object 1.

The environmental light/sound recognition unit 124 calculates, based on the waveforms illustrated in FIG. 6, an overall noise level at a place (observation position c30) where the waveforms are observed. In this case, the environmental light/sound recognition unit 124 may specify a noise model at the observation position c30 based on the waveforms illustrated in FIG. 6. The noise model is a model related to the frequency spectrum of observed sound, temporal change thereof, and the like. Hereinafter, for simplification of description, information of the noise model is included in information of the noise level as appropriate.

The environmental light/sound recognition unit 124 outputs, as the environmental light/sound information 124a, the positions k10 and k20 of the sound sources, which are estimated as described above, the observation position c30, and the noise level (=70 dB (decibel)) at the observation position c30.

In addition, to avoid processing of an identical sound source as different sound sources, the environmental light/sound recognition unit 124 generates identification information (ID) for identifying each sound source based on, for example, the frequency spectrum, temporal change thereof, position, and direction in the optical/acoustic data 121a, and stores the generated ID in sound source data of the corresponding sound source. The environmental light/sound recognition unit 124 also stores, in the environmental light/sound information 124a as information of an observation time indicating when the optical/acoustic data 121a is acquired on which the environmental light/sound information 124a is based, information of a time stamp or the like included in the optical/acoustic data 121a.

1.3.4 Exemplary Operation of Environmental Light/Sound Storage Unit

Figure 8:
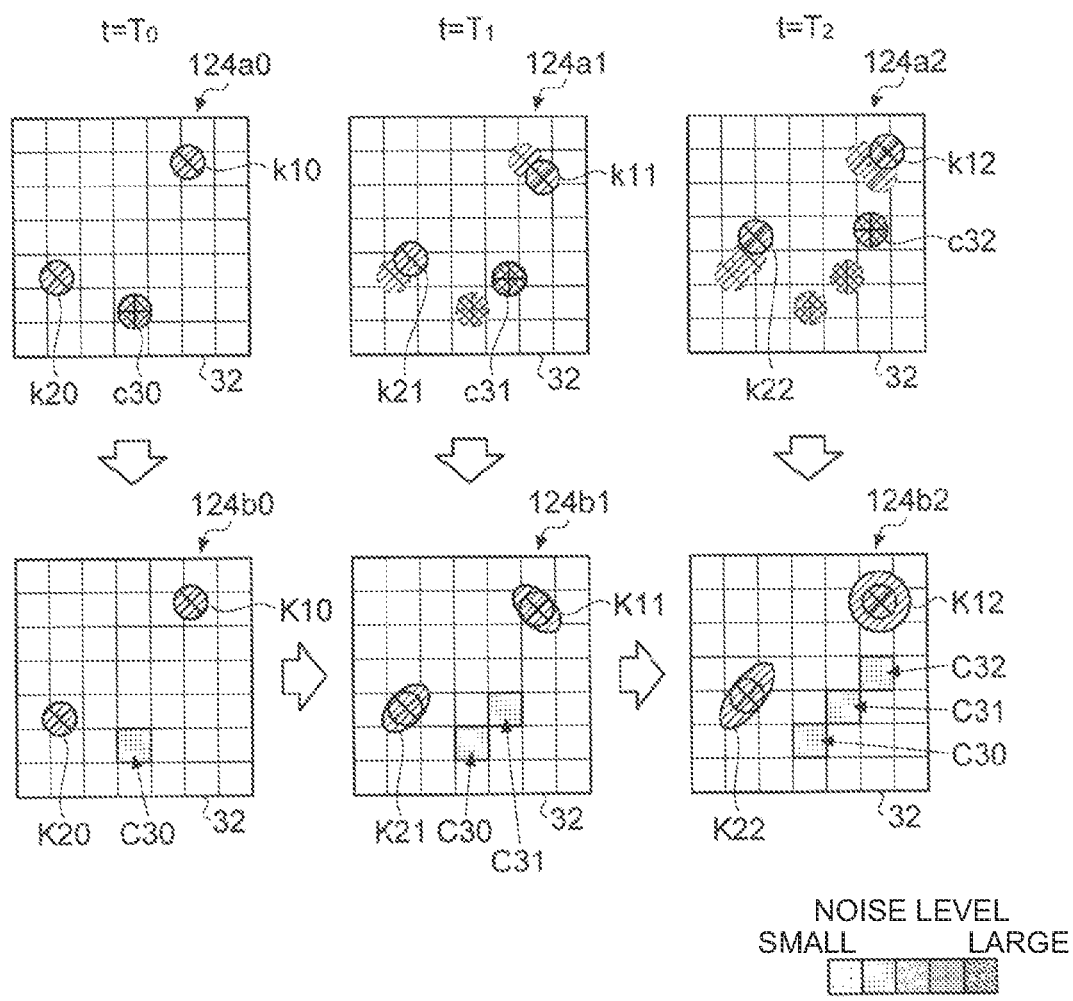
FIG. 8 is a diagram illustrating an exemplary process of processing executed by an environmental light/sound storage unit according to the embodiment of the present disclosure.

Subsequently, exemplary operation of the environmental light/sound storage unit 125 will be described below in detail with reference to the accompanying drawings. The environmental light/sound storage unit 125 integrates, in a temporally sequential manner, the environmental light/sound information 124a output from the environmental light/sound recognition unit 124, thereby improving the accuracy of information related to characteristics of sound at each place in environment, estimating long-period temporal change of the characteristics of sound, and estimating, for example, the moving speed and dispersion (existence probability distribution) of a sound source. FIG. 8 illustrates an exemplary process of processing executed by the environmental light/sound storage unit 125. In FIG. 8, the upper part illustrates exemplary environmental light/sound information 124a (refer to FIG. 7, for example) acquired at each timing $t(=T_0$ to $T_2)$, and the lower part illustrates exemplary environmental sound data (corresponding to the above-described risk data) updated by using the environmental light/sound information 124a obtained at each timing $t(=T_0$ to $T_2)$. No environmental sound data is produced before timing $T_0$. Note that the environmental sound data may be, for example, information related to the position of a sound source and the noise level at the observation position c30.

As illustrated in FIG. 8, the environmental light/sound storage unit 125 produces environmental sound data 124b0 at timing $T_0$ by updating the current environmental sound data based on environmental light/sound information 124a0 (corresponding to the environmental light/sound information 124a in FIG. 7) at timing $T_0$, which is input from the environmental light/sound recognition unit 124. Since no environmental sound data is produced before timing $T_0$, existence probability distributions K10 and K20 based on the positions k10 and k20 of sound sources, and the noise level (for example, 70 dB) at a grid C30 to which the observation position c30 belongs are registered to the environmental sound data 124b0 from the sound source data and information related to an observation position, which are included in the environmental light/sound information 124a0.

Subsequently, the environmental light/sound storage unit 125 produces environmental sound data 124b1 at timing $T_1$ by updating the current environmental sound data 124b0 based on environmental light/sound information 124a1 at timing $T_1$, which is input from the environmental light/sound recognition unit 124. Specifically, the environmental light/sound storage unit 125 generates existence probability distributions K11 and K21 of sound sources based on the existence probability distributions K10 and K20 registered in the environmental sound data 124b0 at timing $T_0$ and positions k11 and k21 of sound sources specified by the sound source data included in the environmental light/sound information 124a1, and updates the environmental sound data 124b0 with the generated existence probability distributions K11 and K21. In addition, the environmental light/sound storage unit 125 newly registers, to the environmental sound data 124b0, the level noise at a grid C31 to which an observation position c31 included in the environmental light/sound information 124a1 belongs. Accordingly, the environmental sound data 124b1 at timing $T_1$ is produced.

Subsequently, the environmental light/sound storage unit 125 produces environmental sound data 124b2 at timing $T_2$ by updating the current environmental sound data 124b1 based on environmental light/sound information 124a2 at timing $T_2$, which is input from the environmental light/sound recognition unit 124. Thereafter, the environmental light/sound storage unit 125 similarly updates the current environmental sound data based on the environmental light/sound information 124a input from the environmental light/sound recognition unit 124, thereby producing the latest environmental sound data at timing t.

1.3.4.1 Sound Source Registration/Update Processing

Figure 9:
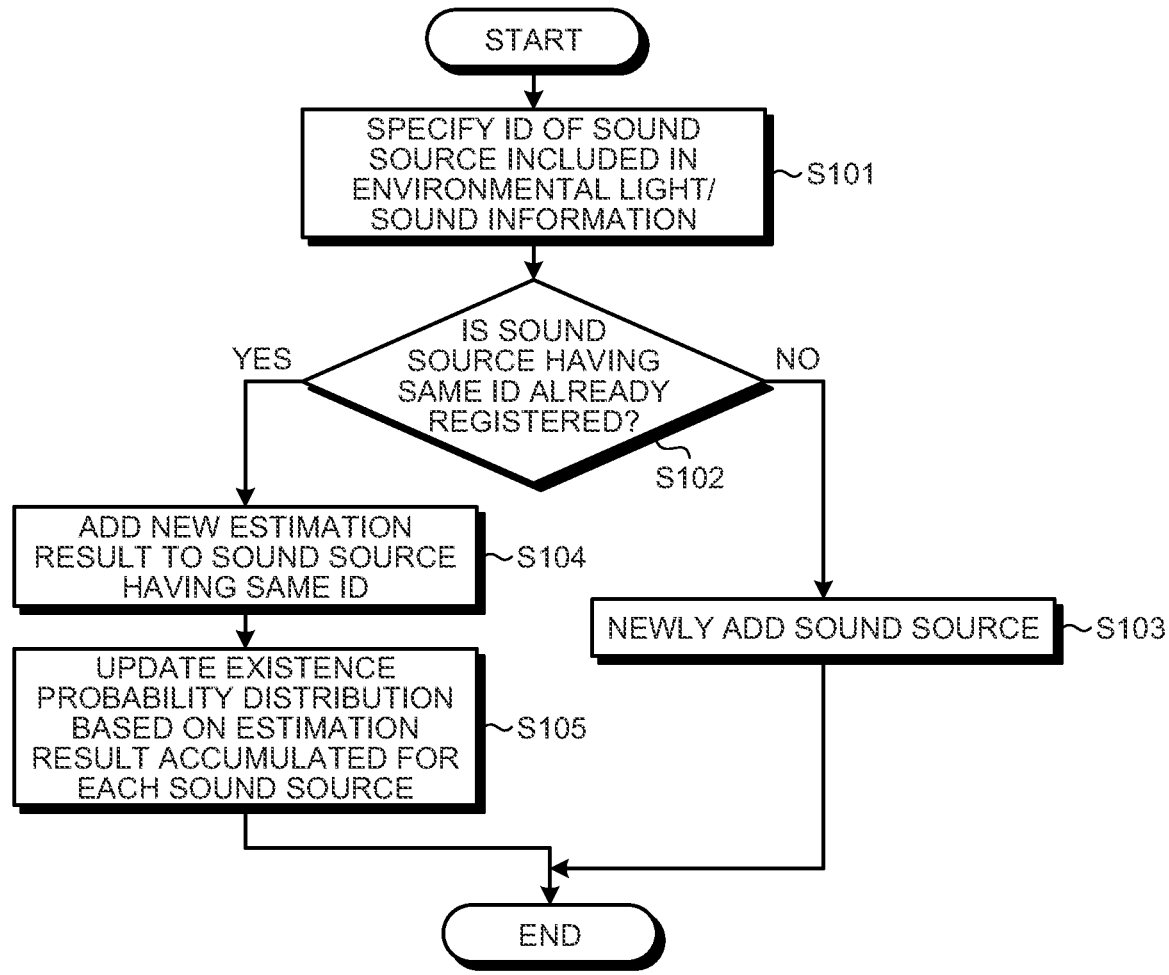
FIG. 9 is a flowchart illustrating exemplary sound source registration/update processing according to the embodiment of the present disclosure.

In the above-described operation executed by the environmental light/sound storage unit 125, the processing (sound source registration/update processing) of newly registering existence probability distributions of sound sources to the environmental sound data based on the positions of sound sources included in the environmental light/sound information 124a at timing t or updating already registered existence probability distributions of sound sources can be, for example, expressed as a flowchart exemplarily illustrated in FIG. 9.

As illustrated in FIG. 9, in the sound source registration/update processing, the environmental light/sound storage unit 125 first specifies the ID of the sound source data included in the environmental light/sound information 124a input at timing t (step S101), and determines whether a sound source having an ID same as the ID specified at step S101 exists among sound sources having existence probability distributions already registered in the environmental sound data (step S102).

When the sound source having the same ID is not registered in the environmental sound data (NO at step S102), the environmental light/sound storage unit 125 generates an existence probability distribution related to a new sound source based on the sound source data having a new ID, adds the generated existence probability distribution to the environmental sound data (step S103), and ends the present operation.

When the sound source having the same ID is already registered in the environmental sound data (YES at step S102), the environmental light/sound storage unit 125 adds a new estimation result (such as position) to the sound source having the same ID in the environmental sound data based on the newly notified sound source data of the environmental light/sound information 124a (step S104). Then, the environmental light/sound storage unit 125 updates the existence probability distribution of each sound source based on the estimation result (such as position and existence probability distribution) accumulated for the sound source in the environmental sound data (step S105). For example, the environmental light/sound storage unit 125 updates the position and existence probability distribution of each sound source based on a plurality of pieces of the sound source data through data fusion such as Kalman filter. Thereafter, the environmental light/sound storage unit 125 ends the present operation.

1.3.4.2 Noise Level Registration Processing at Observation Position

Figure 10:
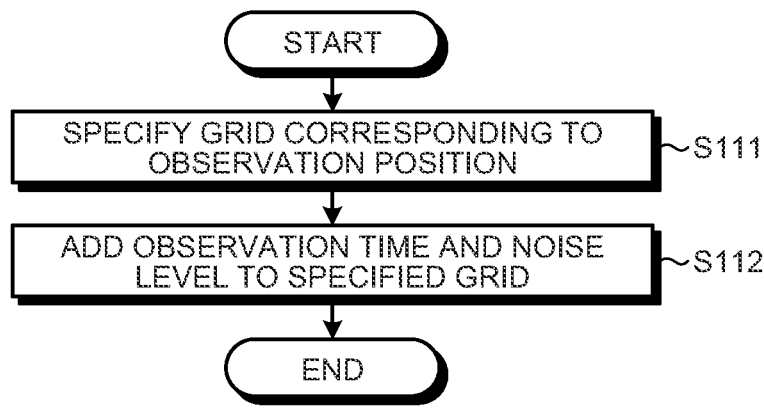
FIG. 10 is a flowchart illustrating exemplary noise level registration processing at an observation position according to the embodiment of the present disclosure.

In the above-described operation executed by the environmental light/sound storage unit 125, the processing (observation-position noise level registration processing) of registering a noise level to a grid to which the observation position of actual observation by the autonomous mobile object 1 belongs can be, for example, expressed as a flowchart exemplarily illustrated in FIG. 10.

As illustrated in FIG. 10, in the observation-position noise level registration processing, the environmental light/sound storage unit 125 first specifies, on the grid map G32, a grid corresponding to an observation position included in the environmental light/sound information 124a input at timing t (step S111). Subsequently, the environmental light/sound storage unit 125 adds, for the specified grid, information of an observation time and a noise level included in the environmental light/sound information 124a to the environmental sound data (step S112), and ends the present operation.

1.3.4.3 Noise Level Estimation Operation

Figure 11:
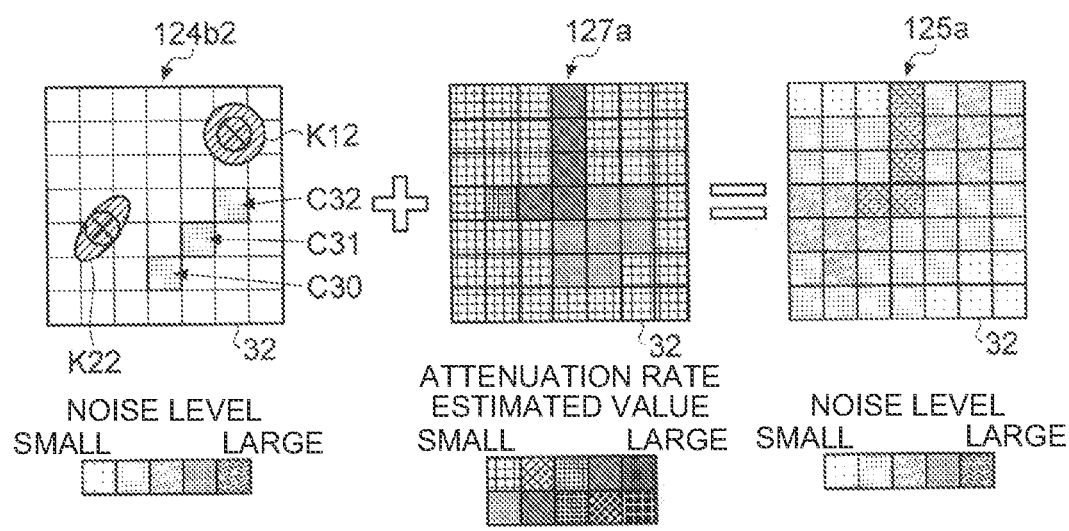
FIG. 11 is a diagram illustrating an exemplary process of processing when a noise level at an unobserved place (grid) is estimated according to the embodiment of the present disclosure.

The environmental light/sound storage unit 125 receives the transfer function map 127a from the transfer function storage unit 127 to be described later in detail and estimates the noise level at an unobserved place (corresponding to a grid on the grid map G32). Note that a place (grid) in the present description does not need to be a point but may be a region having two dimensionality or a space having three dimensionality. FIG. 11 illustrates an exemplary process of processing when the noise level at an unobserved place (grid) is estimated.

As illustrated in FIG. 11, the environmental light/sound storage unit 125 produces the environmental light/sound map 125a on which a noise level is set to an unobserved place (grid) by using the environmental sound data (for example, the environmental sound data 124b2 at the lower-right part in FIG. 8) obtained through the sound source registration/update processing (refer to FIG. 9) and the observation-position noise level registration processing (refer to FIG. 10) and the transfer function map 127a input from the transfer function storage unit 127.

In the following description of a specific process of processing with focus on the observation position c30 and the sound source at the position K22, which are illustrated in FIG. 11, the environmental light/sound storage unit 125 first specifies the acoustic model of the sound source at the position K22 through inverse calculation from the noise level at the grid C30 of the observation position c30 based on the transfer function map 127a. More specifically, the environmental light/sound storage unit 125 causes the noise level set to the grid C30 to inversely and sequentially propagate to grids positioned on a path from the grid C30 to the grid corresponding to the position K22 based on the transfer function map 127a. Accordingly, the acoustic model of the sound source at the position K22 is inversely calculated from the noise level at the grid C30.

Subsequently, the environmental light/sound storage unit 125 causes the acoustic model of the sound source at the position K22 to sequentially propagate from the grid at the position K22 as the starting point to grids other than the grids C30 to C32 based on the transfer function map 127a, thereby estimating and setting noise levels for all grids at which the noise level is not directly observed. Accordingly, the environmental light/sound map 125a on which noise levels are set to all grids is produced as illustrated in the right diagram in FIG. 11. Note that, when noise levels propagating through a plurality of paths are calculated for one grid, for example, the highest noise level may be set as the noise level at the grid.

1.3.4.3.1 Flowchart of Noise Level Estimation Operation

Figure 12:
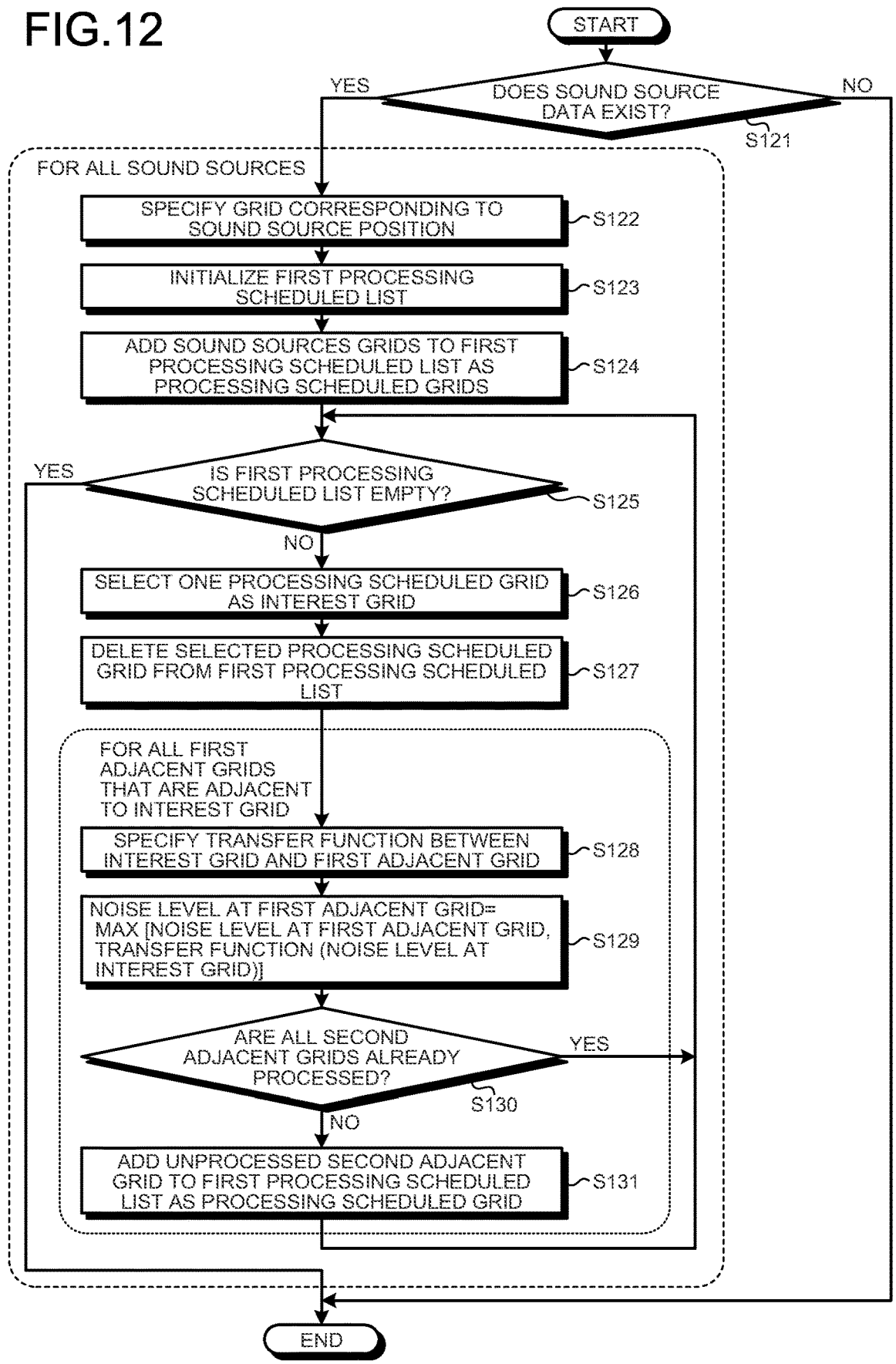
FIG. 12 is a flowchart illustrating exemplary noise level estimation operation according to the embodiment of the present disclosure.

The above-described exemplary noise level estimation operation will be described below with reference to a flowchart illustrated in FIG. 12. As illustrated in FIG. 12, in the present operation, the environmental light/sound storage unit 125 determines whether the sound source data is included in the environmental light/sound information 124a (step S121), and ends the present operation when no sound source data is included (NO at step S121). When the sound source data is included (YES at step S121), the environmental light/sound storage unit 125 proceeds to step S122 and executes the following processing for all pieces of the sound source data included in the environmental light/sound information 124a.

At step S122, for all pieces of the sound source data included in the environmental light/sound information 124a, the environmental light/sound storage unit 125 specifies, on the grid map G32, the grid corresponding to the position of a sound source indicated by each piece of the sound source data. Subsequently, the environmental light/sound storage unit 125 initializes a list (hereinafter referred to as a first processing scheduled list) to which grids scheduled to be processed are registered (step S123), and additionally registers the grids of all sound sources specified at step S122 to the first processing scheduled list as processing scheduled grids (step S124).

Subsequently, the environmental light/sound storage unit 125 determines whether the first processing scheduled list is empty (step S125), and ends the present operation when the first processing scheduled list is empty, in other words, when no processing scheduled grid is registered in the first processing scheduled list (YES at step S125). When any processing scheduled grid is registered in the first processing scheduled list (NO at step S125), the environmental light/sound storage unit 125 selects, as an interest grid, one processing scheduled grid registered in the first processing scheduled list (step S126), and deletes the selected processing scheduled grid from the first processing scheduled list (step S127). Then, the environmental light/sound storage unit 125 proceeds to step S128 and executes the following processing for all adjacent grids (referred to as first adjacent grids) that are adjacent to the interest grid. Note that the rule of the processing scheduled grid selection at step S126 may be any of various kinds of rules such as round robin.

At step S128, the environmental light/sound storage unit 125 specifies the transfer function between the interest grid and each first adjacent grid that is adjacent thereto based on the transfer function map 127a input from the transfer function storage unit 127. Subsequently, the environmental light/sound storage unit 125 sets the noise level at each first adjacent grid to be the larger one of a noise level actually measured at the first adjacent grid and a noise level calculated from the noise level at the interest grid by using the transfer function (step S129). Note that, at step S129, the noise level calculated from the noise level at the interest grid by using the transfer function is set to any first adjacent grid to which no actually measured noise level is set.

Subsequently, the environmental light/sound storage unit 125 determines whether processing of setting a noise level to a grid (referred to as a second adjacent grid) adjacent to each first adjacent grid that is adjacent to the interest grid is already executed (step S130), and returns to step S125 and executes the subsequent operation when the processing is already executed (YES at step S130). When any unprocessed second adjacent grid exists (NO at step S130), the environmental light/sound storage unit 125 adds the unprocessed second adjacent grid to the first processing scheduled list as a processing scheduled grid (step S131), and thereafter returns to step S125 and executes the subsequently operation.

1.3.5 Exemplary Operation of Transfer Function Estimation Unit

Subsequently, exemplary operation of the transfer function estimation unit 126 will be described below in detail with reference to the accompanying drawings. The transfer function is a function that expresses the attenuation rate of each frequency band of sound when the sound is transferred from a place (corresponding to a grid) to another place (corresponding to another grid). Note that, when the risk is a risk propagating in space, such as light, wind, or smell other than sound, the transfer function can be defined to be information indicating transferability of the risk in space.

The operation of the transfer function estimation unit 126 according to the present embodiment may include, for example, a transfer function estimation operation of producing first transfer function information 126b by estimating the transfer function by using the measurement data 101a acquired by the sensor 101, and a noise level interpolation operation of producing second transfer function information 126c by interpolating a noise level by using the environmental sound data input from the environmental light/sound storage unit 125. Note that the transfer function information 126a in the above description includes the first transfer function information 126b and the second transfer function information 126c.

1.3.5.1 Exemplary Transfer Function Estimation operation

Figure 13:
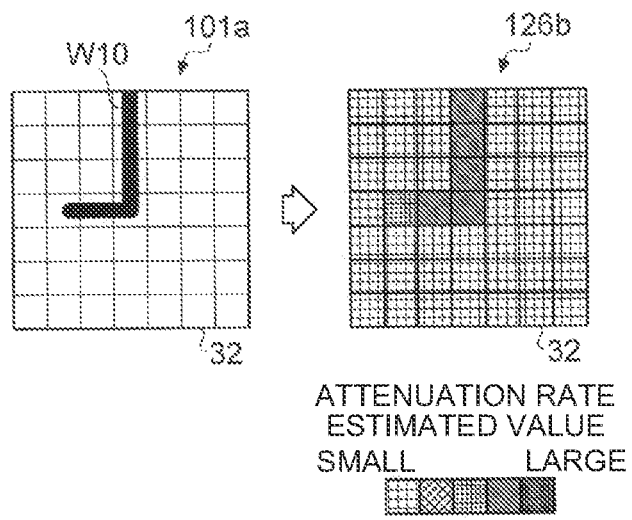
FIG. 13 is a diagram illustrating exemplary transfer function estimation operation according to the embodiment of the present disclosure.

The transfer function estimation operation is operation of estimating the transfer function between places (grids) in a predetermined area with taken into consideration an object recognized through object detection processing on the measurement data 101a. Exemplary transfer function estimation operation will be described below with reference to FIG. 13. As illustrated in FIG. 13, in the transfer function estimation operation, for example, object detection is executed on the measurement data 101a to detect an object such as a wall W10 included in environment and specify the position and arrangement of the wall. Note that detected objects may include a window glass, a curtain, a sofa, and the like in addition to the wall W10. In the transfer function estimation operation, the shape, material, and the like of a detected object are estimated, and the attenuation rate of the object is specified based on the estimated shape, material, and the like of the object. In the example illustrated in FIG. 13, the shape, material, and the like of the wall W10 are estimated, and the attenuation rate of the wall W10 is specified based on the estimated shape, material, and the like. Then, in the transfer function estimation operation, the transfer function between places in the predetermined area is estimated based on the arrangement of specified objects and the attenuation rate of each object. Accordingly, the first transfer function information 126b indicating the attenuation rate at each place (grid) as illustrated on the right side in FIG. 13 is produced. Note that, for example, the reflectance may be specified in addition to the attenuation rate and included in the first transfer function information 126b.

1.3.5.2 Exemplary the Noise Level Interpolation Operation

Figure 14:
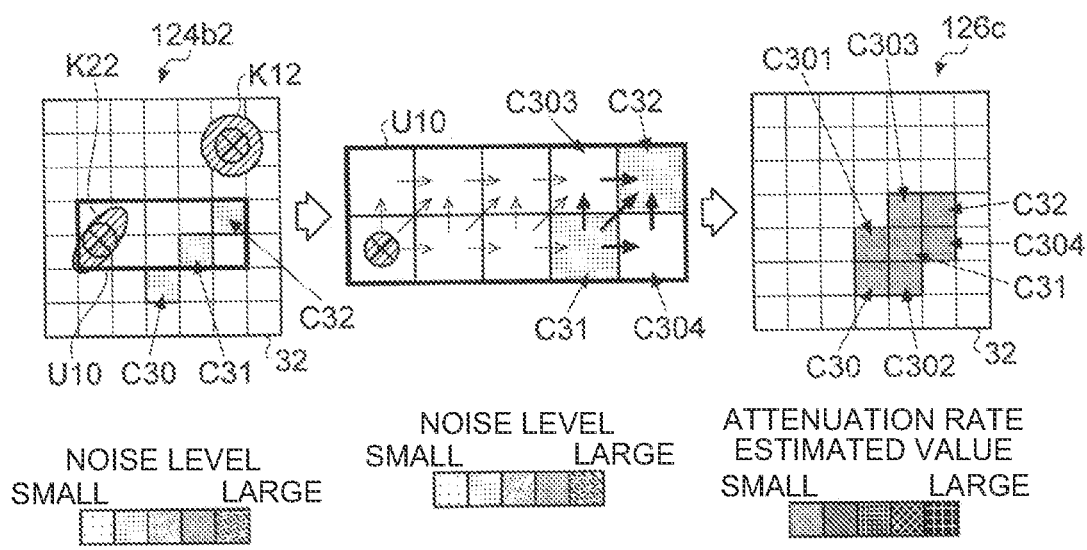
FIG. 14 is a diagram illustrating exemplary noise level interpolation operation according to the embodiment of the present disclosure.

The noise level interpolation operation is operation of interpolating the noise level at each place (grid) in the predetermined area based on the position and noise level of each sound source included in the environmental sound data. Exemplary noise level interpolation operation will be described below with reference to FIG. 14. Note that FIG. 14 exemplarily illustrates a case in which the environmental sound data 124b2 illustrated at the lower-right part of FIG. 8 is uses. As illustrated in FIG. 14, in the noise level interpolation operation, for example, the transfer function between places is directly estimated based on positions K12 and K22 of sound sources included in the environmental sound data 124b2 and the noise level at grids C30 to C32 corresponding to observation positions c30 to c32. Specifically, in a region U10 in the environmental sound data 124b2 illustrated on the left side in FIG. 14, sound having propagated from a sound source positioned at the position K22 to the grid C31 of the observation position c31 further propagates to the grid C32 of the observation position c32 through a path through an adjacent grid C303, a path through an adjacent grid C304, and a direct path in an oblique direction as illustrated in a diagram at the center in FIG. 14. Thus, the noise level at each of the adjacent grids C303 and C304 can be directly calculated from the difference between the noise level at the grid C31 of the observation position c31 and the noise level at the grid C32 of the observation position c32. For example, the noise level at each of the adjacent grids 303 and C304 can be calculated to be a noise level at the middle between the noise level at the grid C31 of the observation position c31 and the noise level at the grid C32 of the observation position c32. Similarly, the noise level at each of adjacent grids C301 and C302 adjacent to the grid C30 corresponding to the observation position c30 and the grid C31 corresponding to the observation position c31 can be directly calculated. Accordingly, as illustrated on the right side in FIG. 14, the second transfer function information 126c including an interpolated noise level at a grid sandwiched between grids to each of which a noise level is already set is produced.

1.3.5.2.1 Flowchart of Noise Level Interpolation Operation

Figure 15:
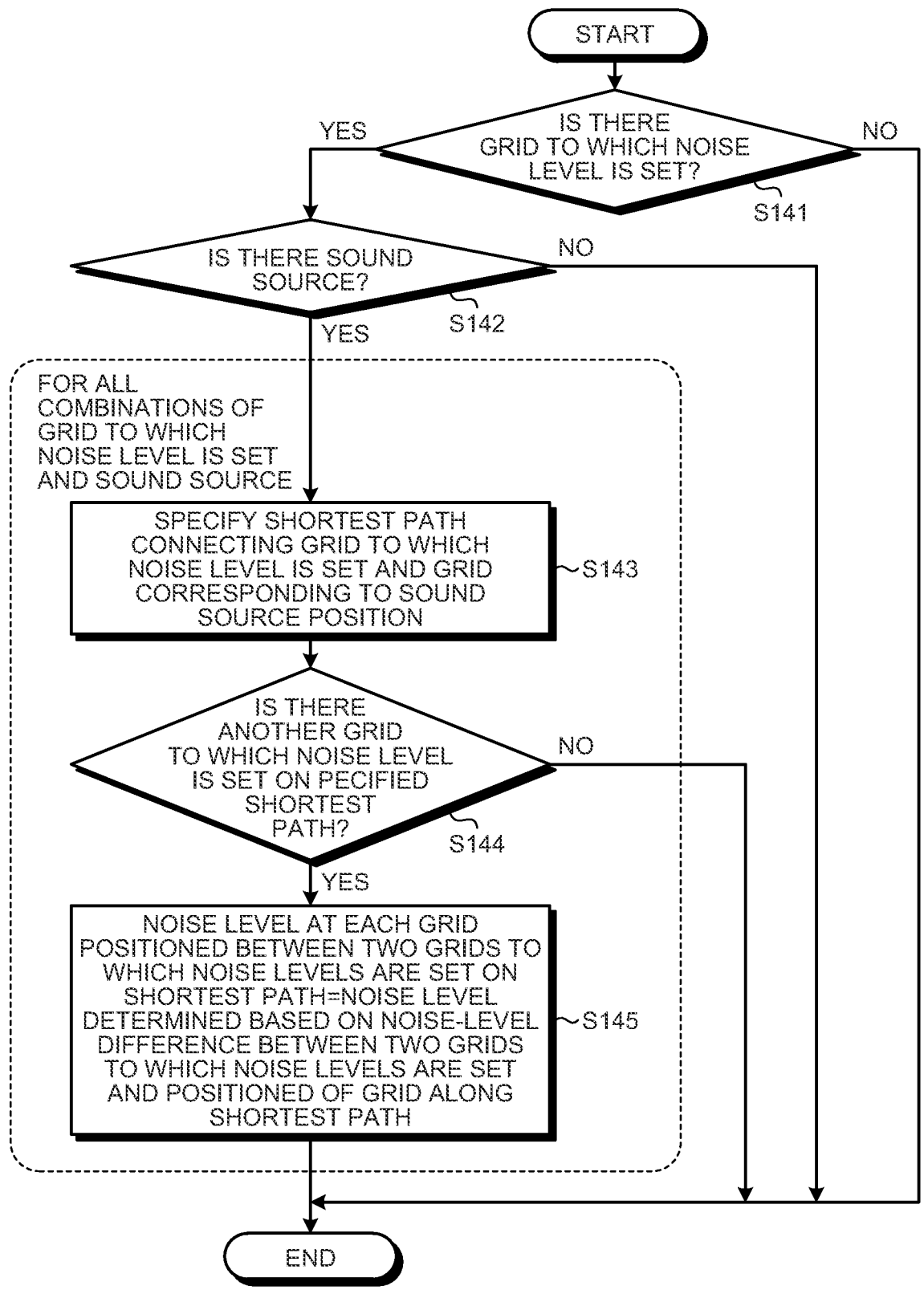
FIG. 15 is a flowchart illustrating exemplary noise level interpolation operation according to the embodiment of the present disclosure.

The exemplary noise level interpolation operation will be described below with reference to a flowchart illustrated in FIG. 15. As illustrated in FIG. 15, in the noise level interpolation operation, the transfer function estimation unit 126 first determines whether a grid to which a noise level is set exists in the environmental sound data input from the environmental light/sound storage unit 125 (step S141). When no grid to which a noise level is set exists (NO at step S141), the transfer function estimation unit 126 ends the present operation. When a grid to which a noise level is set exists (YES at step S141), the transfer function estimation unit 126 subsequently determines whether a sound source is included in the environmental sound data (step S142). When no sound source is included (NO at step S142), the transfer function estimation unit 126 ends the present operation. When a sound source is included (YES at step S142), the transfer function estimation unit 126 proceeds to step S143 and executes the subsequent operation on all combinations of the grid to which a noise level is set and the sound source.

At step S143, the transfer function estimation unit 126 specifies a shortest path connecting the grid to which a noise level is set and the grid corresponding to the position of the sound source. Subsequently, the transfer function estimation unit 126 determines whether another grid to which a noise level is set exists on the specified shortest path (step S144). When no other grid exists (NO at step S144), the transfer function estimation unit 126 ends the present operation. When another grid exists (YES at step S144), the transfer function estimation unit 126 calculates the noise level at each grid positioned between two grids to each of which a noise level is set on the shortest path based on the noise-level difference between the two grids to each of which a noise level is set and the distance from the sound source along the shortest path between the two grids to each of which a noise level is set (step S145), and ends the present operation. Note that, at step S145, for example, the gradient of a function indicating the increased or decreased amount of the noise level along with change of the position on the shortest path is calculated from the position and noise level of a grid to which the noise level is set on a side closer to the sound source on the shortest path and the position and noise level of a grid to which the noise level is set on a side far from the sound source on the shortest path, and the noise level at another grid sandwiched between two grids to which noise levels are set on the shortest path is calculated based on the gradient.

1.3.6 Exemplary Operation of Transfer Function Storage Unit

Figure 16:
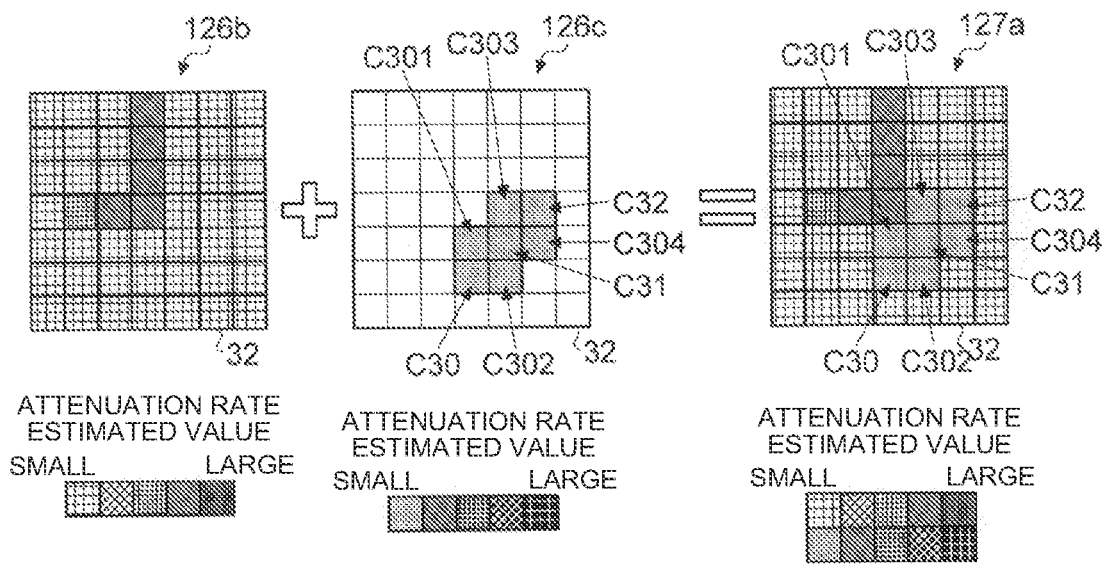
FIG. 16 is a diagram illustrating exemplary operation executed by a transfer function storage unit according to the embodiment of the present disclosure.

Subsequently, exemplary operation of the transfer function storage unit 127 will be described below in detail with reference to the accompanying drawings. The transfer function storage unit 127 produces the transfer function map 127a by integrating the first transfer function information 126b and the second transfer function information 126c produced by the transfer function estimation unit 126. FIG. 16 illustrates the process of the processing of integrating the first transfer function information 126b and the second transfer function information 126c.

As illustrated in FIG. 16, for the grids C30 to C32 and the adjacent grids C301 to C304 to each of which a noise level is set in the second transfer function information 126c, the transfer function storage unit 127 integrates the first transfer function information 126b and the second transfer function information 126c by overwriting the attenuation rate and the like set in the first transfer function information 126b with the noise level set in the second transfer function information 126c. Accordingly, the transfer function map 127a illustrated on the right side in FIG. 16 is produced.

1.3.7 Exemplary Operation of Behavior Planning Map Production Unit

Subsequently, exemplary operation of the behavior planning map production unit 104 will be described below in detail with reference to the accompanying drawings. The behavior planning map production unit 104 receives the influence target map 123a, the environmental light/sound map 125a, and the transfer function map 127a produced as described above and produces the behavior planning map 104a used to produce a plan of behavior executed by the autonomous mobile object 1.

When a behavior plan of a typical autonomous mobile object is produced, costs in accordance with the existence of an obstacle and the distance to the obstacle are used. In the present embodiment, in addition to or in place of such an obstacle-based cost, influence of sound generated by the autonomous mobile object 1 on an influence target is used as a cost. For example, when sound of X dB is generated at a place, sound reaching an influence target is Y dB. Thus, in the present embodiment, a cost is determined in accordance with a degree to which the influence target is bothered by sound of Y dB, and a behavior plan of the autonomous mobile object 1 is produced by using the cost.

Figure 17:
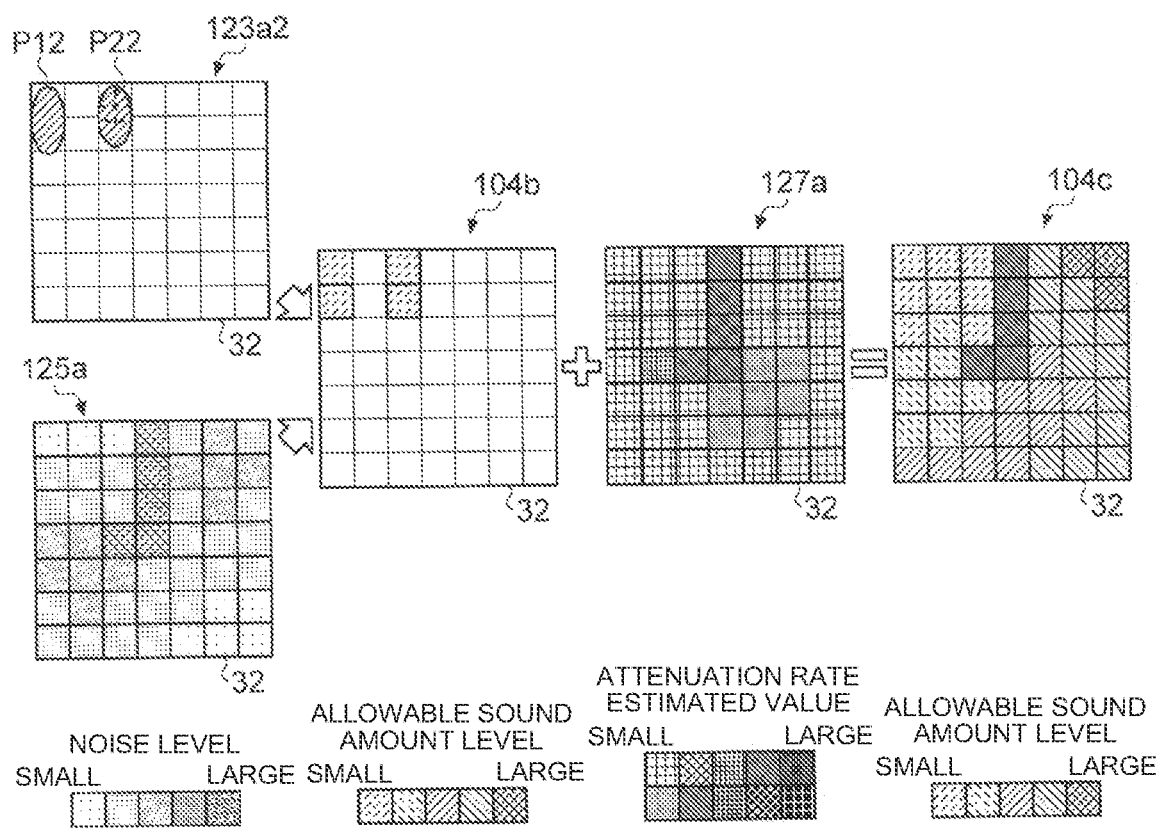
FIG. 17 is a diagram illustrating exemplary processing when an allowable sound amount map is produced according to the embodiment of the present disclosure.

To use, as a cost, influence of sound generated by the autonomous mobile object 1 on an influence target, an allowable sound amount map with which influence on an influence target existing in a predetermined area is equal to or smaller than an allowable value is produced in the present embodiment. The allowable sound amount map registers an allowable sound amount with which influence on an influence target existing in the predetermined area when the autonomous mobile object 1 generates sound at each place is equal to or smaller than the allowable value, in other words, a maximum value of sound that the autonomous mobile object 1 is allowed to generate at each place. FIG. 17 illustrates exemplary processing when the behavior planning map production unit 104 produces the allowable sound amount map. Note that the example illustrated in FIG. 17 exemplarily illustrates a case in which the allowable sound amount map is produced by using an influence target map 123a2 illustrated at the lower-right part in FIG. 4, the environmental light/sound map 125a illustrated on the right side in FIG. 11, and the transfer function map 127a illustrated on the right side in FIG. 16.

As illustrated in FIG. 17, the behavior planning map production unit 104 acquires information such as positions P12 and P22 of influence targets and estimated sensitivities of the influence targets from the influence target map 123a2 and specifies the noise level at the grids corresponding to the positions P12 and P22 of the influence targets from the environmental light/sound map 125a, thereby estimating the allowable sound amount at the grids corresponding to the positions P12 and P22 of the influence targets and producing an influence target position allowable sound amount map 104b by disposing the allowable sound amount on the grid map G32. Note that the estimation of the allowable sound amount at the grid corresponding to the position of an influence target can be achieved by determining in advance, as a function, a rule for estimating the allowable sound amount for each influence target, such as "an influence target is not bothered by sound at X dB or lower because the noise level has reached X dB at the position of the influence target".

Subsequently, the behavior planning map production unit 104 causes the allowable sound amount estimated for the grids corresponding to the positions P12 and P22 of the influence targets to propagate to the entire grid by using the inverse function of a transfer function obtained from the transfer function map 127a. For example, when it is specified based on the transfer function map 127a and the like that a frequency band attenuates by Y dB when transferred to an adjacent grid, an inverse function that sets, to a grid on a side far from the grid corresponding to the position of an influence target, an allowable sound amount obtained by increasing the allowable sound amount at a grid on a side closer to the corresponding grid by Y dB is used when the allowable sound amount is caused to propagate from the grid on the closer side to the grid on the far side, thereby causing the allowable sound amount estimated for the grids corresponding to the positions P12 and P22 of the influence targets to propagate to the entire grid. Accordingly, the allowable sound amount map 104c in which the maximum value of sound that the autonomous mobile object 1 is allowed to generate at each place is registered is produced.

The produced allowable sound amount map 104c is output to the behavior planning unit 105 as the behavior planning map 104a together with a map for calculating costs in accordance with the existence of an obstacle and the distance to the obstacle, or alone.

1.3.7.1 Flowchart of Allowable Sound Amount Map Production Operation

Figure 18:
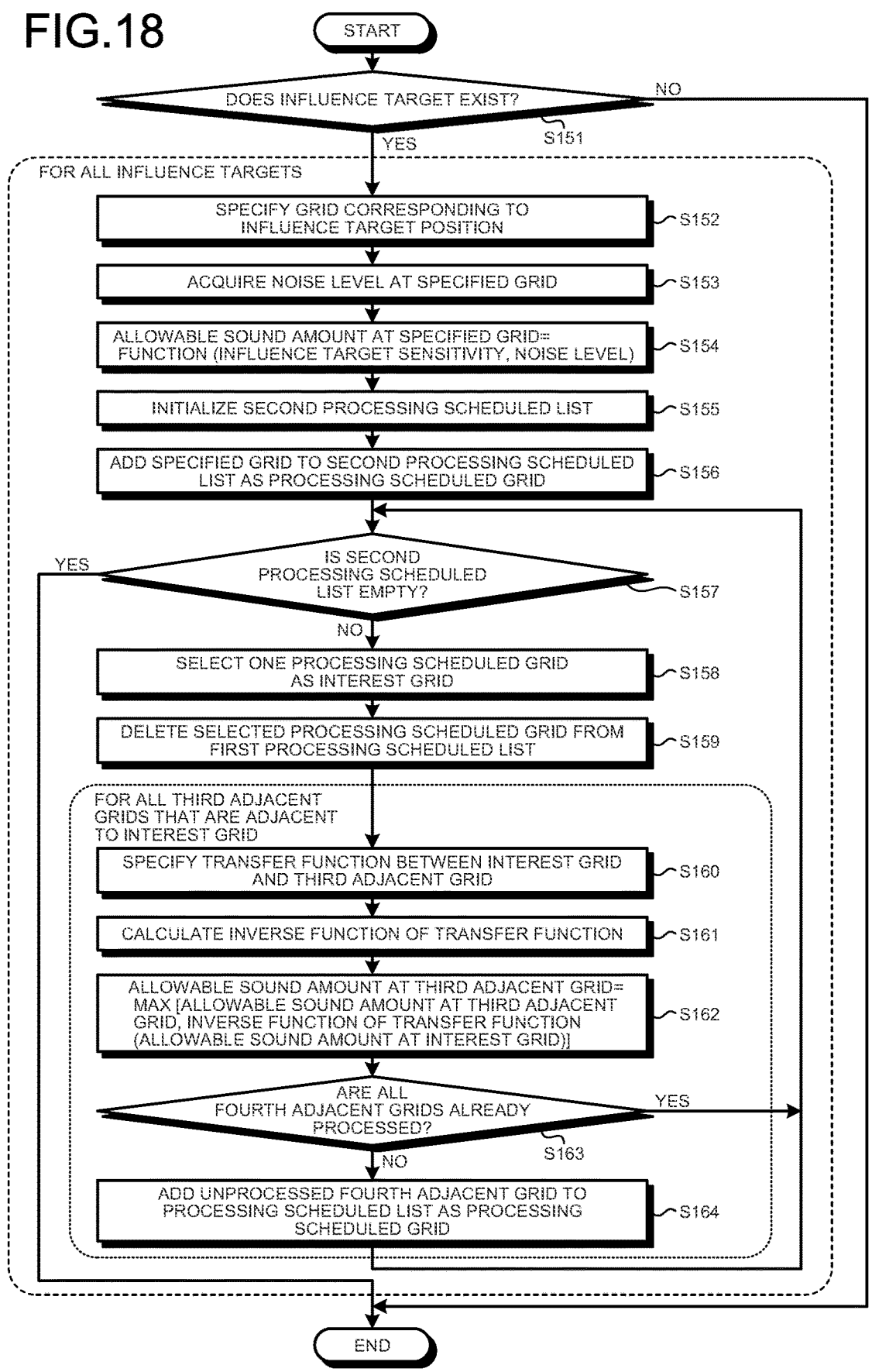
FIG. 18 is a flowchart illustrating exemplary processing when the allowable sound amount map is produced according to the embodiment of the present disclosure.

Subsequently, exemplary operation when the behavior planning map production unit 104 produces the allowable sound amount map 104c will be described below with reference to a flowchart illustrated in FIG. 18. As illustrated in FIG. 18, in the present operation, the behavior planning map production unit 104 first determines whether an influence target exists in a predetermined area based on the influence target map 123a (step S151). When no influence target exists (NO at step S151), the behavior planning map production unit 104 ends the present operation. When an influence target exists (YES at step S151), the behavior planning map production unit 104 proceeds to step S152 and executes the subsequent operation for all influence targets included in the influence target map 123a.

At step S152, the behavior planning map production unit 104 specifies the grids corresponding to the positions of all influence targets included in the influence target map 123a. Subsequently, the behavior planning map production unit 104 acquires the noise level at the specified grids by referring to the environmental light/sound map 125a (step S153). Then, the behavior planning map production unit 104 calculates the allowable sound amount at each specified grid by using the function determined in advance to estimate the allowable sound amount for each influence target (step S154). For example, the behavior planning map production unit 104 calculates the allowable sound amount at each specified grid by substituting, into the function determined in advance, the estimated sensitivity of each influence target acquired from the influence target map 123a and the noise level at the specified grid.

Subsequently, the behavior planning map production unit 104 initializes a list (hereinafter referred to as a second processing scheduled list) to which a grid scheduled to be processed is registered (step S155), and additionally registers, as processing scheduled grids to the second processing scheduled list, the grids corresponding to the positions of all influence targets specified at step S152 (step S156).

Subsequently, the behavior planning map production unit 104 determines whether the second processing scheduled list is empty (step S157), and ends the present operation when the second processing scheduled list is empty, in other words, when no processing scheduled grid is registered in the second processing scheduled list (YES at step S157). When any processing scheduled grid is registered in the second processing scheduled list (NO at step S157), the behavior planning map production unit 104 selects, as an interest grid, one processing scheduled grid registered in the second processing scheduled list (step S158) and deletes the selected processing scheduled grid from the second processing scheduled list (step S159). Then, the behavior planning map production unit 104 proceeds to step S160 executes the following processing for all adjacent grids (referred to as third adjacent grids) that are adjacent to the interest grid. Note that the rule of the processing scheduled grid selection at step S158 may be any of various kinds of rules such as round robin.

At step S160, the behavior planning map production unit 104 specifies the transfer function between the interest grid and each third adjacent grids that is adjacent thereto based on the transfer function map 127a input from the transfer function storage unit 127. Subsequently, the behavior planning map production unit 104 sets the allowable sound amount at each third adjacent grid to be the larger one of the allowable sound amount calculated for the third adjacent grid at step S154 and the allowable sound amount calculated by using the inverse function of the transfer function based on the allowable sound amount at the interest grid (step S162). Note that, at step S162, the allowable sound amount calculated by using the inverse function of the transfer function based on the allowable sound amount at the interest grid is set to any third adjacent grid for which the allowable sound amount is not calculated at step S154.

Subsequently, the behavior planning map production unit 104 determines whether processing of setting an allowable sound amount to a grid (referred to as a fourth adjacent grid) adjacent to each third adjacent grid that is adjacent to the interest grid is already executed (step S163), and returns to step S157 and executes the subsequent operation when the processing is already executed (YES at step S163). When any unprocessed fourth adjacent grid exists (NO at step S163), the behavior planning map production unit 104 adds the unprocessed fourth adjacent grid to the second processing scheduled list as a processing scheduled grid (step S164), and thereafter returns to step S157 and executes the subsequent operation.

1.3.8 Exemplary Operation of Behavior Planning Map Production Unit

When the behavior planning unit 105 produces a behavior plan of the autonomous mobile object 1 by using the behavior planning map 104a including the allowable sound amount map 104c produced as described above, behavior of the autonomous mobile object 1 at each place is planned based on, for example, the allowable sound amount at each place, which is registered in the allowable sound amount map 104c. For example, when noise generated by the autonomous mobile object 1 is larger as speed is higher, the behavior planning unit 105 determines the maximum moving speed of the autonomous mobile object 1 at each place based on the allowable sound amount at each place, which is registered in the allowable sound amount map 104c. In addition, the behavior planning unit 105 restricts, based on sound generated by the autonomous mobile object 1, a region in which the autonomous mobile object 1 is allowed to move.

1.4 Exemplary System Configuration

Figure 19:
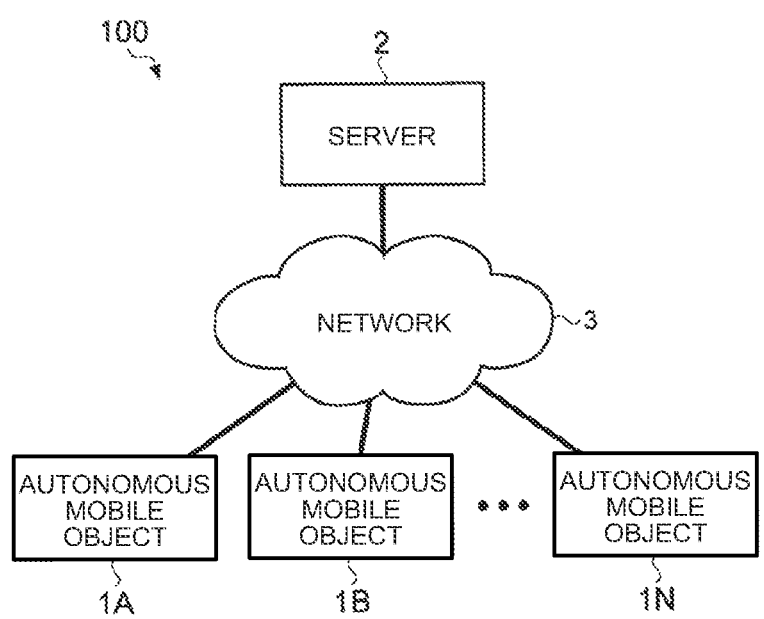
FIG. 19 is a block diagram illustrating an exemplary schematic configuration of the autonomous system according to the embodiment of the present disclosure.

Subsequently, an exemplary system configuration of the autonomous system 100 according to the present embodiment will be described below in detail with reference to the accompanying drawings. FIG. 19 is a block diagram illustrating the exemplary schematic configuration of the autonomous system 100 according to the present embodiment. As illustrated in FIG. 19, the autonomous system 100 according to the present embodiment has a configuration in which one or more autonomous mobile objects 1A to 1N are connected with a server 2 through a network 3. Among components described above with reference to FIG. 2, for example, the recognition unit 102, the map production unit 103, the behavior planning map production unit 104, the behavior planning unit 105, the influence target recognition unit 122, the influence target storage unit 123, the environmental light/sound recognition unit 124, the environmental light/sound storage unit 125, the transfer function estimation unit 126, and the transfer function storage unit 127 may be disposed on the server 2 side. The server 2 may be a server group of a plurality of servers such as cloud servers.

When the behavior planning map production unit 104 is disposed on the server 2 side, the behavior planning map production unit 104 may produce a behavior planning map common to the one or more autonomous mobile object 1 existing in an identical area by integrating the influence target map 123a, the environmental light/sound map 125a, and the transfer function map 127a generated from the optical/acoustic data 121a and the measurement data 101a acquired by the optical/acoustic sensor 121 and the sensor 101 mounted on each of the one or more autonomous mobile objects 1. Accordingly, the behavior planning map 104a can be produced by using a larger amount of information, and thus the behavior planning map 104a that is more accurate can be produced.

1.5 Autonomous Mobile Object

Figure 20:
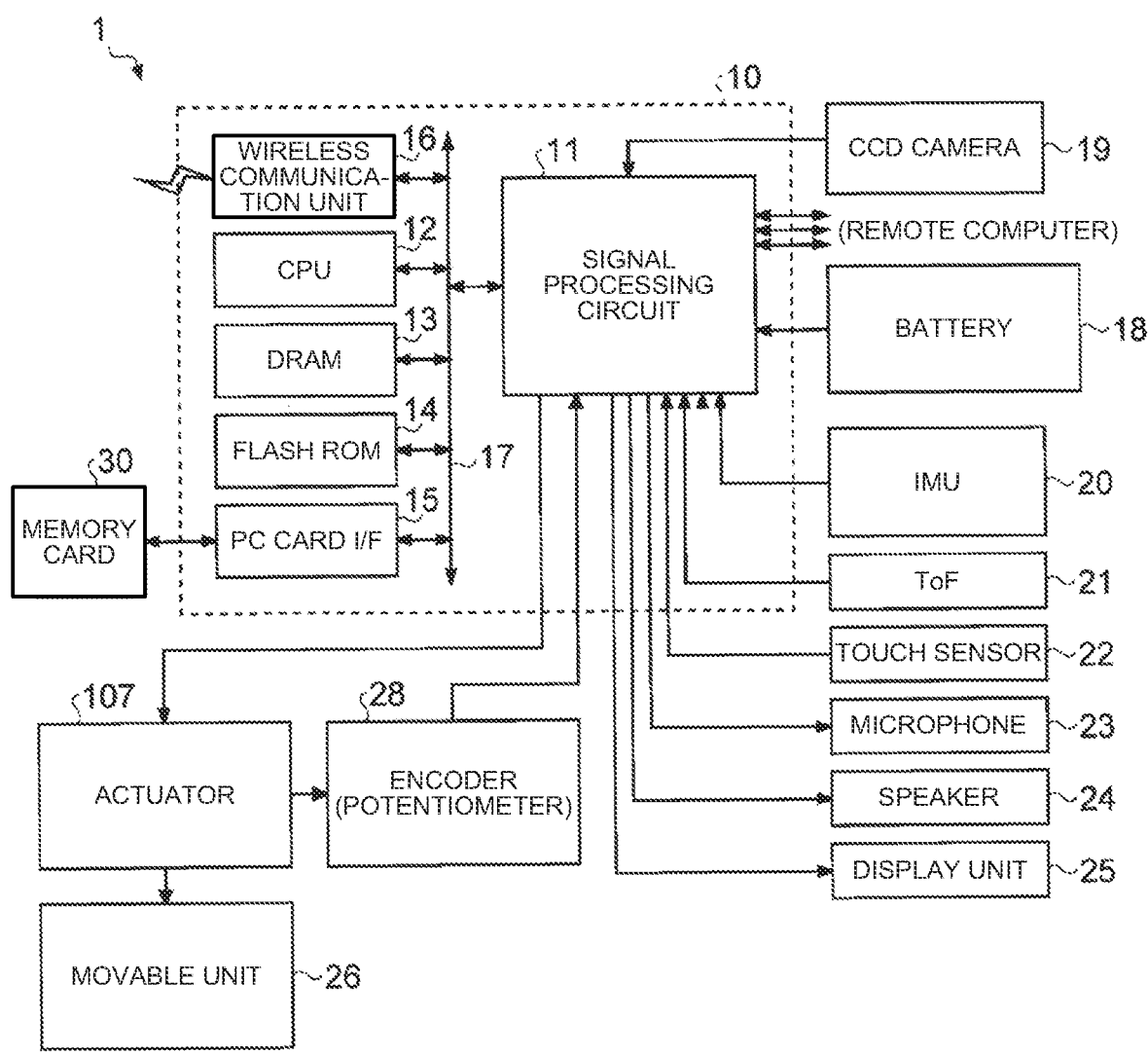
FIG. 20 is a block diagram illustrating an exemplary schematic configuration of the autonomous mobile object according to the embodiment of the present disclosure.

Subsequently, an exemplary autonomous mobile object 1 according to the present embodiment will be described below in detail with reference to the accompanying drawings. FIG. 20 is a block diagram illustrating an exemplary schematic configuration of the autonomous mobile object according to the present embodiment. As illustrated in FIG. 20, the autonomous mobile object 1 includes, for example, a control unit 10 formed by connecting a central processing unit (CPU) 12, a dynamic random access memory (DRAM) 13, a flash read only memory (ROM) 14, a personal computer (PC) card interface (I/F) 15, a wireless communication unit 16, and a signal processing circuit 11 with one another through an internal bus 17, and a battery 18 as a power source of the autonomous mobile object 1. The control unit 10 corresponds to, for example, the control unit 106 in the above description.

The autonomous mobile object 1 also includes, as operation mechanisms for achieving operations such as movement and gesture, a movable unit 26 including joint parts of arms and legs, wheels, and caterpillars, and an actuator 107 for driving the movable unit.

In addition, the autonomous mobile object 1 includes, as sensors (hereinafter referred to as internal sensors) for acquiring information such as a movement distance, a movement speed, a movement direction, and a posture, an inertial measurement unit (IMU) 20 for detecting the orientation and motion acceleration of the host device, and an encoder (potentiometer) 28 configured to detect the drive amount of the actuator 107. Note that, in addition to these components, an acceleration sensor, an angular velocity sensor, and the like, may be used as the internal sensors.

In addition, the autonomous mobile object 1 includes, as sensors (hereinafter referred to as external sensors) configured to acquire information such as a land shape in surroundings of the host device and the distance and direction to an object existing in surroundings of the host device, a charge coupled device (CCD) camera 19 configured to capture an image of an external situation, and a time-of-flight (ToF) sensor 21 configured to measure the distance to an object existing in a particular direction with respect to the host device. Note that, in addition to these components, for example, a light detection-and-ranging or laser-imaging-detection-and-ranging (LIDAR) sensor, a global positioning system (GPS) sensor, a magnetic sensor, and a measurement unit (hereinafter referred to as a radio field intensity sensor) for the radio field intensity of Bluetooth (registered trademark), Wi-Fi (registered trademark), or the like at the wireless communication unit 16 may be used as the external sensors.

The autonomous mobile object 1 also includes, as the optical/acoustic sensor 121, a microphone 23 from collecting external sound. Note that the above-described CCD camera 19 may be used not only as an external sensor but also as one optical/acoustic sensor 121. However, the present disclosure is not limited, but a separate light sensor may be provided as the optical/acoustic sensor 121.

Note that the autonomous mobile object 1 may be provided with a touch sensor 22 for detecting physical pressure received from the outside, a speaker 24 for outputting voice or the like to surroundings, and a display unit 25 for displaying various kinds of information to a user or the like.

In the above-described configuration, various sensors such as the IMU 20, the touch sensor 22, the ToF sensor 21, the microphone 23, the speaker 24, and the encoder (potentiometer) 28, the display unit, the actuator 107, the CCD camera (hereinafter simply referred to as camera) 19, and the battery 18 are each connected with the signal processing circuit 11 of the control unit 10.

The signal processing circuit 14 sequentially acquires sensor data, image data, and voice data supplied from various sensors described above and sequentially stores each data at a predetermined position in the DRAM 13 through the internal bus 17. In addition, the signal processing circuit 11 sequentially acquires battery remaining amount data indicating a battery remaining amount supplied from the battery 18 and stores the data at a predetermined position in the DRAM 13.

The sensor data, the image data, the voice data, and the battery remaining amount data stored in the DRAM 13 in this manner are used when the CPU 12 performs operation control of the autonomous mobile object 1, and are transmitted to the external server 2 through the wireless communication unit 16 as necessary. When the influence target information 122a, the influence target map 123a, the environmental light/sound information 124a, the environmental light/sound map 125a, the transfer function information 126a, the transfer function map 127a, the external information 102a, the external map 103a, the behavior planning map 104a, and the like, are produced on the autonomous mobile object 1 side, these pieces of data may be transmitted to the external server 2 through the wireless communication unit 16 as necessary. Note that the wireless communication unit 16 may be a communication unit for performing communication with the external server 2 through, for example, Bluetooth (registered trademark) or Wi-Fi (registered trademark) as well as a predetermined network such as a wireless local area network (LAN) or a mobile communication network.

For example, in an initial phase in which the autonomous mobile object 1 is turned on, the CPU 12 reads, through the PC card interface 15 or directly, a control program stored in a memory card 30 or the flash ROM 14 mounted on a PC card slot (not illustrated) and stores the program in the DRAM 13.

In addition, the CPU 12 determines the situation of the host device and the surroundings, the existence of an instruction or action from the user, and the like, based on the sensor data, the image data, the voice data, and the battery remaining amount data sequentially stored in the DRAM 13 by the signal processing circuit 11 as described above.

In addition, the CPU 12 executes self-position estimation and various kinds of operation by using map data stored in the DRAM 13 or the like or map data acquired from the external server 2 through the wireless communication unit 16, and various kinds of information. For example, the CPU 12 generates the control command 106a to be provided to the actuator 107 based on the behavior plan information (host device) 105a acquired from the external server 2 through the wireless communication unit 16, and outputs the control command 106a to the actuator 107 through the signal processing circuit 11.

Then, the CPU 12 determines subsequent behavior based on the above-described determination result, an estimated self-position, the control program stored in the DRAM 13, the produced or received behavior plan information (host device) 105a, and the like, and executes various kinds of behavior such as movement and gesture by driving the actuator 107 needed based on a result of the determination.

In this process, the CPU 12 generates voice data as necessary, provides the data as a voice signal to the speaker 24 through the signal processing circuit 11 to externally output voice based on the voice signal, and causes the display unit 25 to display various kinds of information.

In this manner, the autonomous mobile object 1 is configured to autonomously behave in accordance with the situation of the host device and surroundings and an instruction and an action from the user.

Note that the above-described configuration of the autonomous mobile object 1 is merely exemplary and applicable to various kinds of autonomous mobile objects in accordance with a purpose and usage. Specifically, the autonomous mobile object 1 in the present disclosure is applicable not only to an autonomous mobile robot such as a domestic pet robot, a robot cleaner, an unmanned aircraft, a follow-up transport robot, and the like, but also to various kinds of mobile objects, such as an automobile, configured to estimate the self-position.

1.6 Conclusion

As described above, according to the present embodiment, it is possible to estimate influence of a risk generated by the autonomous mobile object 1 on an influence target in surroundings. Thus, according to the present embodiment, since it is possible to estimate influence on an influence target in surroundings, attributable to behavior of the autonomous mobile object 1, before the autonomous mobile object 1 performs the behavior, it is possible to produce in advance a behavior plan that reduces influence on the influence target in surroundings. For example, it is possible to plan behavior with which influence of a risk generated by the autonomous mobile object 1 on an influence target in surroundings is equal to or smaller than an allowable value. As a result, it is possible to achieve the autonomous system 100 that can be accepted in environment that is likely to be affected by a risk such as a person, such as a library or an office.

Since influence on an influence target in surroundings, attributable to behavior of the autonomous mobile object 1 is estimated in advance, it is possible to produce a behavior plan of the autonomous mobile object 1 so that a risk generated by the autonomous mobile object 1 is equal to or smaller than the allowable amount in accordance with surrounding environment. In addition, it is desired not only to prevent influence of the autonomous mobile object 1 on an influence target in surroundings but also to actively affect surroundings in some cases of warning sound, projection, and the like. With the autonomous system 100 according to the present embodiment, in such a case as well, it is possible to appropriately adjust the degree of a risk generated by the autonomous mobile object 1 by estimating the amount of influence on a target desired to be affected.

Although the embodiment of the present disclosure is described above, the technical scope of the present disclosure is not limited to the above-described embodiment as it is, but may include various kinds of modifications without departing from the gist of the present disclosure. Components of the embodiment and the modification, respectively, may combined as appropriate.

The effects of the embodiment disclosed in the present specification are merely exemplary, but not limited and may include other effects.

Note that the present technique may be configured as follows.

(1)

An information processing device comprising a planning unit configured to plan behavior executed by a drive unit based on an influence target existing in a predetermined area and affected by a risk propagating in space.

(2)

The information processing device according to (1), further comprising a production unit configured to produce an influence target map that includes information related to the influence target in the predetermined area, wherein
    the planning unit plans the behavior executed by the drive unit based on the influence target map.

(3)

The information processing device according to (2), further comprising a recognition unit configured to determine the position of the influence target in the predetermined area based on sensor information acquired by a predetermined sensor, wherein
    the production unit produces, based on the position of the influence target in the predetermined area, which is determined by the recognition unit, the influence target map including information related to a region in which the influence target is likely to exist, and
    the planning unit plans the behavior executed by the drive unit based on the information included in the influence target map and related to the region in which the influence target is likely to exist.

(4)

The information processing device according to (3), wherein
    the recognition unit further determines a degree of influence of the risk on the influence target based on the sensor information,
    the production unit produces the influence target map including the degree of the influence, which is determined by the recognition unit, and
    the planning unit plans the behavior executed by the drive unit based on the degree of the influence included in the influence target map, in addition to the information related to the region in which the influence target is likely to exist.

(5)

The information processing device according to (1), further comprising a production unit configured to produce an environment map including information related to a degree of a risk attributable to a generation source of the risk, other than the drive unit, in the predetermined area, wherein
    the planning unit plans the behavior executed by the drive unit based on the environment map.

(6)

The information processing device according to (5), further comprising a recognition unit configured to determine the degree of a risk observed at each place in the predetermined area and the position of a generation source of the risk in the predetermined area based on sensor information acquired by a predetermined sensor, wherein
    the production unit produces the environment map based on the degree of the risk observed at each place in the predetermined area and the position of the generation source of the risk in the predetermined area, which are determined by the recognition unit, and
    the planning unit plans the behavior executed by the drive unit based on the information included in the environment map and related to the degree of a risk attributable to a generation source of the risk, other than the drive unit, at each place in the predetermined area.

(7)

The information processing device according to (6), wherein the production unit specifies the degree of the risk at the position of the generation source of the risk in the predetermined area by propagating the degree of the risk observed at each place in the predetermined area to the position of the generation source of the risk in the predetermined area based on an inverse function of a predetermined transfer function, and generates information related to the degree of the risk attributable to a generation source of the risk, other than the drive unit, at each place in the predetermined area by propagating the specified degree of the risk at the position of the generation source of the risk in the predetermined area to each place in the predetermined area based on the predetermined transfer function.

(8)

The information processing device according to (1), further comprising a production unit configured to produce a transfer function map including information related to a transfer function indicating transferability of the risk in space in the predetermined area, wherein
    the planning unit plans the behavior executed by the drive unit based on the transfer function map.

(9)

The information processing device according to (8), further comprising an estimation unit configured to specify a position and attenuation rate of an object existing in the predetermined area based on sensor information acquired by a predetermined sensor and determine an attenuation rate at each place in the predetermined area based on the specified position and attenuation rate of the object, wherein
    the production unit produces the transfer function map based on the attenuation rate at each place in the predetermined area, which is determined by the estimation unit.

(10)

The information processing device according to (8), further comprising an estimation unit configured to interpolate a degree of a risk at a place where the degree of the risk is not observed in the predetermined area based on the degree of a risk observed at each place in the predetermined area and the position of a generation source of the risk in the predetermined area, which are determined based on sensor information acquired by a predetermined sensor, wherein
    the production unit produces the transfer function map based on the degree of the risk observed at each place in the predetermined area and the degree of the risk at the place where the degree of the risk is not observed in the predetermined area, the degree being interpolated by the estimation unit.

(11)

The information processing device according to (10), wherein the estimation unit calculates the degree of the risk at the place where the degree of the risk is not observed in the predetermined area based on a positional relation between the position of a generation source of the risk in the predetermined area and the place where the degree of the risk is observed.

(12)

The information processing device according to (1), further comprising:
    a first production unit configured to produce an influence target map that includes information related to the influence target in the predetermined area;

a second production unit configured to produce an environment map including information related to a degree of a risk attributable to a generation source of the risk, other than the drive unit, in the predetermined area; and
a third production unit configured to produce a transfer function map including information related to a transfer function indicating transferability of the risk in space in the predetermined area, wherein
the planning unit plans the behavior executed by the drive unit based on the influence target map, the environment map, and the transfer function map.

(13)

The information processing device according to (12), further comprising a fourth production unit configured to produce a map related to a degree of a risk allowed to occur to the drive unit based on the influence target map, the environment map, and the transfer function map, wherein
the planning unit plans the behavior executed by the drive unit based on the map related to the degree of the allowed risk.

(14)

The information processing device according to any one of (1) to (13), wherein the risk is at least one of sound, light, wind, and smell.

(15)

The information processing device according to any one of (1) to (13), wherein
the risk is sound, and
the influence target is an influence target affected by sound.

(16)

The information processing device according to any one of (1) to (15), wherein the drive unit is a drive unit mounted on an autonomous mobile object including a mechanism configured to autonomously move.

(17)

The information processing device according to any one of (1) to (15), further comprising the drive unit configured to execute behavior that causes generation of the risk.

(18)

An information processing system comprising:
an autonomous mobile object including a drive unit configured to execute behavior that causes generation of a risk propagating in space; and
a server connected with the autonomous mobile object through a predetermined network to perform mutual communication and including a planning unit configured to plan behavior executed by the drive unit based on an influence target affected by the risk existing in a predetermined area.

(19)

The behavior planning method comprising a process of planning behavior executed by a drive unit based on an influence target existing in a predetermined area and affected by a risk propagating in space.

(20)

A computer program for causing a computer to execute a step of planning behavior executed by a drive unit based on an influence target existing in a predetermined area and affected by a risk propagating in space.

(21)

The information processing device according to any one of (1) to (17), in which the drive unit is a drive unit mounted on a domestic pet robot, a robot cleaner, an unmanned aircraft, a follow-up transport robot, an automobile having an automated driving function, a robotic arm, or a smart speaker.

REFERENCE SIGNS LIST 1 autonomous mobile object
10 control unit
11 signal processing circuit
12 CPU
13 DRAM
14 flash ROM
15 PC card interface
16 wireless communication unit
17 internal bus
18 battery
19 CCD camera
20 IMU
21 ToF sensor
22 touch sensor
23 microphone
24 speaker
25 display unit
26 movable unit
28 encoder (potentiometer)
30 memory card
100 autonomous system
101 sensor
101$a$ measurement data
102 recognition unit
102$a$ external information
102$b$ own-device state
103 map production unit
103$a$ external map
104 behavior planning map production unit
104$a$ behavior planning map
104$b$ influence target position allowable sound amount map
104$c$ allowable sound amount map
105 behavior planning unit
105$a$ behavior plan information (host device)
106 control unit
106$a$ control command
107 actuator
121 optical/acoustic sensor
121$a$ optical/acoustic data
122 influence target recognition unit
122$a$, 122$a$0, 122$a$1, 122$a$2 influence target information
123 influence target storage unit
123$a$, 123$a$0, 123$a$1, 123$a$2 influence target map
124 environmental light/sound recognition unit
124$a$, 124$a$0, 124$a$1, 124$a$2 environmental light/sound information
124$b$, 124$b$0, 124$b$1, 124$b$2 environmental sound data
125 environmental light/sound storage unit
125$a$ environmental light/sound map
126 transfer function estimation unit
126$a$ transfer function information
126$b$ first transfer function information
126$c$ second transfer function information
127 transfer function storage unit
127$a$ transfer function map

The invention claimed is:

1. An information processing device, comprising:
circuitry configured to:
generate an environment map including information related to a degree of a risk, wherein
the degree of the risk is attributable to a generation source of the risk,
the generation source of the risk is in a determined area, the generation source of the risk is different from an actuator, the risk propagates in a space associated with the actuator, the risk corresponds to at least one of sound or light, and characteristics of the risk include at least one of a frequency spectrum, a temporal change, or a direction of the risk;

plan behavior executable by the actuator, wherein the behavior is planned based on the environment map and an influence target that exists in the determined area, and the influence target is affected by the risk; and output, based on the planned behavior, control information to control the actuator.

2. The information processing device according to claim 1, wherein the circuitry is further configured to:

generate an influence target map that includes information related to the influence target in the determined area; and plan the behavior based on the influence target map.

3. The information processing device according to claim 2, wherein the circuitry is further configured to:

determine a position of the influence target in the determined area based on sensor information acquired by a sensor;

generate, based on the position of the influence target in the determined area, the influence target map including information related to a region in which the influence target is likely to exist; and plan the behavior based on the information included in the influence target map and related to the region in which the influence target is likely to exist.

4. The information processing device according to claim 3, wherein the circuitry is further configured to:

determine, based on the sensor information, a degree of influence of the risk on the influence target;

generate the influence target map including the degree of the influence; and plan the behavior based on the degree of the influence included in the influence target map.

5. The information processing device according to claim 1, wherein the circuitry is further configured to:

determine, based on sensor information acquired by a sensor, the degree of the risk observed at each place of a plurality of places in the determined area and at a position of the generation source of the risk in the determined area;

generate the environment map based on the degree of the risk observed at each place of the plurality of places and at the position of the generation source of the risk; and plan the behavior based on the information included in the environment map and related to the degree of the risk, attributable to the generation source of the risk, at each place of the plurality of places.

6. The information processing device according to claim 5, wherein the circuitry is further configured to:

specify the degree of the risk at the position of the generation source of the risk, by propagation of the degree of the risk observed at each place of the plurality of places to the position of the generation source of the risk, wherein the degree of the risk at the position of the generation source of the risk is specified based on an inverse function of a transfer function; and generate, based on the transfer function, the information related to the degree of the risk attributable to the generation source of the risk at each place of the plurality of places, by propagation of the specified degree of the risk at the position of the generation source of the risk to each place of the plurality of places.

7. The information processing device according to claim 1, wherein the circuitry is further configured to:

generate a transfer function map including information related to a transfer function, wherein the information related to the transfer function indicates transferability of the risk in the space; and plan the behavior based on the transfer function map.

8. The information processing device according to claim 7, wherein the circuitry is further configured to:

specify a position and an attenuation rate of an object in the determined area based on sensor information acquired by a sensor;

determine an attenuation rate at each place of a plurality of places in the determined area based on the specified position and the attenuation rate of the object; and generate the transfer function map based on the attenuation rate at each place of the plurality of places.

9. The information processing device according to claim 7, wherein the circuitry is further configured to:

interpolate the degree of the risk at a place in the determined area where the degree of the risk is not observed in the determined area, wherein the interpolation is based on the degree of the risk observed at each place of a plurality of places in the determined area and at a position of the generation source of the risk, and the degree of the risk at each place of the plurality of places and the position of the generation source are based on sensor information acquired by a sensor; and generate the transfer function map based on the degree of the risk observed at each place of the plurality of places and the degree of the risk at the place where the degree of the risk is not observed.

10. The information processing device according to claim 9, wherein the circuitry is further configured to calculate, based on a positional relation between the position of the generation source of the risk and a place of the plurality of places where the degree of the risk is observed, the degree of the risk at the place where the degree of the risk is not observed.

11. The information processing device according to claim 1, wherein the circuitry is further configured to:

generate an influence target map that includes information related to the influence target in the determined area;

generate a transfer function map including information related to a transfer function, wherein the information related to the transfer function indicates transferability of the risk in the space; and plan the behavior based on the influence target map, the environment map, and the transfer function map.

12. The information processing device according to claim 11, wherein the circuitry is further configured to:

generate, based on the influence target map, the environment map, and the transfer function map, a map related to a degree of an allowed risk allowed to occur to the actuator; and plan the behavior based on the map related to the degree of the allowed risk.

13. The information processing device according to claim 1, wherein the risk further corresponds to at least one of wind or smell.

14. The information processing device according to claim 1, wherein
the risk corresponds to the sound, and
the influence target is affected by the sound.

15. The information processing device according to claim 1, wherein the actuator includes a drive unit mounted on an autonomous mobile object that is autonomously movable.

16. The information processing device according to claim 1, further comprising the actuator configured to execute the behavior that causes generation of the risk.

17. An information processing system, comprising:
an autonomous mobile object including an actuator configured to execute behavior that causes generation of a risk, wherein
the risk propagates in a space surrounding the autonomous mobile object,
the risk corresponds to at least one of sound or light, and
characteristics of the risk include at least one of a frequency spectrum, a temporal change, or a direction of the risk; and
a server configured to communicate with the autonomous mobile object through a network,
wherein the server comprises circuitry configured to:
generate an environment map including information related to a degree of the risk, wherein
the degree of the risk is attributable to a generation source of the risk,
the generation source of the risk is in a determined area, and
the generation source of the risk is different from the actuator;
plan the behavior executable by the actuator, wherein
the behavior is planned based on the environment map and an influence target that exists in the determined area, and
the influence target is affected by the risk; and
output, based on the planned behavior, control information to control the actuator.

18. A behavior planning method, comprising:
generating an environment map including information related to a degree of a risk, wherein
the degree of the risk is attributable to a generation source of the risk,
the generation source of the risk is in a determined area,
the generation source of the risk is different from an actuator,
the risk propagates in a space associated with the actuator,
the risk corresponds to at least one of sound or light, and
characteristics of the risk include at least one of a frequency spectrum, a temporal change, or a direction of the risk;
planning behavior executable by the actuator, wherein
the behavior is planned based on the environment map and an influence target existing in the determined area, and
the influence target is affected by the risk; and
outputting, based on the planned behavior, control information to control the actuator.

19. A non-transitory computer-readable medium having stored thereon computer-executable instructions, that when executed by a processor, cause the processor to execute operations, the operations comprising:
generating an environment map including information related to a degree of a risk, wherein
the degree of the risk is attributable to a generation source of the risk,
the generation source of the risk is in a determined area,
the generation source of the risk is different from an actuator,
the risk propagates in a space associated with the actuator,
the risk corresponds to at least one of sound or light, and
characteristics of the risk include at least one of a frequency spectrum, a temporal change, or a direction of the risk;
planning behavior executable by the actuator, wherein
the behavior is planned based on the environment map and an influence target existing in the determined area, and
the influence target is affected by the risk propagating in space; and
outputting, based on the planned behavior, control information to control the actuator.

* * * * *